(12) United States Patent
Okamoto et al.

(10) Patent No.: US 7,333,972 B2
(45) Date of Patent: *Feb. 19, 2008

(54) DATABASE INTEGRATION MANAGEMENT METHOD AND APPARATUS AND PROCESSING PROGRAM, MEDIUM THEREFOR

(75) Inventors: Chikashi Okamoto, Yokohama (JP); Kazuo Takaragi, Ebina (JP); Yasuko Fukuzawa, Yokohama (JP); Hideki Tokuyama, Sagamihara (JP); Mitsuo Usami, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 382 days.

This patent is subject to a terminal disclaimer.

(21) Appl. No.: 11/177,415

(22) Filed: Jul. 11, 2005

(65) Prior Publication Data

US 2006/0004800 A1 Jan. 5, 2006

Related U.S. Application Data

(63) Continuation of application No. 09/931,251, filed on Aug. 17, 2001, now Pat. No. 6,922,686.

(30) Foreign Application Priority Data

Nov. 2, 2000 (JP) ............................. 2000-335882

(51) Int. Cl.
*G06F 17/30* (2006.01)

(52) U.S. Cl. ............................. 707/1; 707/6; 707/200

(58) Field of Classification Search .................... 707/1, 707/3, 6, 7, 10, 100, 101, 200, 203; 705/1
See application file for complete search history.

(56) References Cited

U.S. PATENT DOCUMENTS 5,478,990 A    12/1995    Montanari et al.
5,659,740 A    8/1997     Ezaki et al.
6,249,768 B1   6/2001     Tulskie et al.
6,418,441 B1   7/2002     Call ............................. 707/10
6,591,300 B1   7/2003     Yurkovic ..................... 709/226
6,704,720 B2 * 3/2004     Arai et al. ...................... 707/3
6,714,947 B2   3/2004     Fa ........................... 707/104.1
6,785,805 B1 * 8/2004     House et al. .................. 713/1

FOREIGN PATENT DOCUMENTS

EP    0977137    2/2000

(Continued)

*Primary Examiner*—Don Wong
*Assistant Examiner*—Marcin Filipczyk
(74) *Attorney, Agent, or Firm*—Mattingly, Stanger, Malur & Brundidge, P.C.

(57) ABSTRACT

The technology includes the steps of: associating material-object identification code identifying each individual material object with material-object information representing information about material object identified by identification code and storing identification code and material-object information in material-object information database in each of business categories; sending code and information stored in database in each business category; integrating items of information having same code with each other among codes and items of information received from database in each business category to generate integrated material-object information, associating identification code with integrated material-object information identified by code and storing identification code and integrated material-object information in integrated database; requesting to send integrated material-object information associated with given identification code; reading requested integrated material-object information from integrated database and sending integrated information to requester of integrated material-object information; and receiving and outputting sent integrated material-object information.

10 Claims, 26 Drawing Sheets

FOREIGN PATENT DOCUMENTS

| | | |
|---|---|---|
| JP | 05307579 | 11/1993 |
| JP | 06258442 | 9/1994 |
| WO | 9613015 | 5/1996 |
| WO | 0013112 | 3/2000 |

* cited by examiner

FIG. 13A

| PRODUCER ID | PRODUCER NAME | ADDRESS | PERSON IN CHARGE | DESCRIPTION | ... |
|---|---|---|---|---|---|
| p0001 | FARM A | AOMORI PREFECTURE ... | AOMORI ICHIRO | APPLES PRODUCED BY FARM A ARE ... | ... |

| MATERIAL-OBJECT ID | AVERAGE AMBIENT TEMPERATURE | SHIPMENT DATE | FRESHNESS DATE | FORWARDING AGENT ID | DESTINATION ID | ... |
|---|---|---|---|---|---|---|
| m0001 | 20.0 | 2000/10/1 | 2000/10/14 | t0001 | s0001 | ... |
| m0002 | 19.3 | 2000/10/2 | 2000/10/15 | t0002 | s0002 | ... |
| .. | .. | .. | .. | .. | .. | ... |

FIG. 13B

| PRODUCER ID | PRODUCER NAME | ADDRESS | PERSON IN CHARGE | DESCRIPTION | ... |
|---|---|---|---|---|---|
| p0002 | FARM B | AOMORI PREFECTURE ... | SHIINA RINGO | APPLES PRODUCED BY FARM B ARE ... | ... |

| MATERIAL-OBJECT ID | AVERAGE AMBIENT TEMPERATURE | SHIPMENT DATE | FRESHNESS DATE | FORWARDING AGENT ID | DESTINATION ID | ... |
|---|---|---|---|---|---|---|
| m0003 | 18.5 | 2000/10/1 | 2000/10/14 | t0001 | s0001 | ... |
| .. | .. | .. | .. | .. | .. | ... |

| FORWARDING AGENT ID | FORWARDING AGENT NAME | ADDRESS | PERSON IN CHARGE | DESCRIPTION | ... |
|---|---|---|---|---|---|
| t0001 | FORWARDING AGENT A | AOMORI PREFECTURE ... | BUTURYU TARO | FORWARDING AGENT A PROVIDES FRESH ... | ... |

| MATERIAL-OBJECT ID | COLLECTION DATE | FORWARDING DATE | VEHICLE NUMBER | DESTINATION ID | ARRIVAL DATE | ... |
|---|---|---|---|---|---|---|
| m0001 | 2000/10/1 | 2000/10/2 | v0001 | s0001 | 2000/10/3 | ... |
| m0003 | 2000/10/1 | 2000/10/2 | v0002 | s0001 | 2000/10/3 | ... |
| ... | ... | ... | ... | ... | ... | ... |

| FORWARDING AGENT ID | FORWARDING AGENT NAME | ADDRESS | PERSON IN CHARGE | DESCRIPTION | ... |
|---|---|---|---|---|---|
| t0002 | FORWARDING AGENT B | AOMORI PREFECTURE ... | UNYU JIRO | FORWARDING AGENT B PROVIDES QUICK ... | ... |

| MATERIAL-OBJECT ID | COLLECTION DATE | FORWARDING DATE | VEHICLE NUMBER | DESTINATION ID | ARRIVAL DATE | ... |
|---|---|---|---|---|---|---|
| m0003 | 2000/10/1 | 2000/10/2 | v0011 | s0002 | 2000/10/2 | ... |
| ... | ... | ... | ... | ... | ... | ... |

| SELLING AGENT ID | SELLING AGENT NAME | ADDRESS | PERSON IN CHARGE | DESCRIPTION |
|---|---|---|---|---|
| s0001 | SUPERMARKET A | TOKYO... | HAMBAI YOSHIO | SUPERMARKET A PROVIDES A LOT OF ... |

| MATERIAL-OBJECT ID | RECEIPT DATE | DISPLAY POSITION | SALES PRICE | SALES DATE |
|---|---|---|---|---|
| m0001 | 2000/10/3 | SHELF 001 | 100 | 2000/10/5 |
| m0003 | 2000/10/3 | SHELF 002 | 95 | 2000/10/7 |
| ... | ... | ... | ... | ... |

| SELLING AGENT ID | SELLING AGENT NAME | ADDRESS | PERSON IN CHARGE | DESCRIPTION |
|---|---|---|---|---|
| s0002 | STORE B | AOMORI PREFECTURE... | YASUURI GORO | SHOP B PROVIDES CHEEP ... |

| MATERIAL-OBJECT ID | RECEIPT DATE | DISPLAY POSITION | SALES PRICE | SALES DATE |
|---|---|---|---|---|
| m0002 | 2000/10/2 | SHELF 001 | 100 | 2000/10/5 |
| ... | ... | ... | ... | ... |

FIG. 29

| QUESTIONNAIRE SURVEY AGENT ID | QUESTIONNAIRE SURVEY AGENT NAME | ADDRESS | PERSON IN CHARGE | ... |
|---|---|---|---|---|
| a0001 | CONSUMER INFORMATION CENTER A | TOKYO ... | SUZUKI ICHIRO | ... |

| MATERIAL OBJECT ID | RATING | COMMENT | ... |
|---|---|---|---|
| m0001 | A | SWEET AND DELICIOUS | ... |
| m0002 | B | SWEET | ... |
| m0003 | C | SLIGHTLY BLEMISHED | ... |
| ... | ... | ... | ... |

| MATERIAL-OBJECT ID | PRODUCER ID | AVERAGE AMBIENT TEMPERATURE | SHIPPING DATE | FRESHNESS DATE |
|---|---|---|---|---|
| m0001 | p0001 | 20.0 | 2000/10/1 | 2000/10/14 |
| m0002 | p0001 | 19.3 | 2000/10/2 | 2000/10/15 |
| m0003 | p0002 | 18.5 | 2000/10/1 | 2000/10/14 |
| : | : | : | : | : |

| FORWARDING AGENT ID | COLLECTION DATE | FORWARDING DATE | VEHICLE NUMBER | ARRIVAL DATE |
|---|---|---|---|---|
| t0001 | 2000/10/1 | 2000/10/2 | v0001 | 2000/10/3 |
| t0002 | 2000/10/2 | 2000/10/2 | v0011 | 2000/10/2 |
| t0001 | 2000/10/1 | 2000/10/2 | v0002 | 2000/10/3 |
| : | : | : | : | : |

| SELLING AGENT ID | RECEIPT DATE | DISPLAY POSITION | SALES PRICE | SALES DATE |
|---|---|---|---|---|
| t0001 | 2000/10/3 | SHELF 001 | 100 | 2000/10/5 |
| t0002 | 2000/10/4 | SHELF 011 | 100 | 2000/10/6 |
| t0001 | 2000/10/3 | SHELF 002 | 95 | 2000/10/7 |
| : | : | : | : | : |

| QUESTIONNAIRE SURVEY AGENT ID | RATING | COMMENT |
|---|---|---|
| a0001 | A | SWEET AND DELICIOUS |
| a0001 | B | SWEET |
| a0001 | C | SLIGHTLY BLEMISHED |
| : | : | |

DATABASE INTEGRATION MANAGEMENT METHOD AND APPARATUS AND PROCESSING PROGRAM, MEDIUM THEREFOR

The present application is a continuation of application Ser. No. 09/931,251, filed Aug. 17, 2001 now U.S. Pat. No. 6,922,686, the contents of which are incorporated herein by reference.

BACKGROUND OF THE INVENTION

The present invention relates to a database integration management system for integrating information stored in a plurality of databases in different categories of business and, in particular, to a technology that is advantageously applied to a database integration management system for individually managing information about individual material objects to allow information in databases to be used across a plurality of categories of business.

When a material object is produced by a producer, transported to a selling agent by a forwarding agent, then sold by a selling agent to consumers, each of categories of business such as the producer, forwarding agent, and selling agent conventionally stores information about the material object in their respective databases and manages the material object in a manner suitable for each of the categories of business.

A concept called Customer Relationship Management (CRM) is being introduced in many business categories, which enables an optimum response to any inquiry from customers by extending the concept of business innovation achieved by information technology in sales departments to share and manage customer information and customer contact history among all departments that communicate with the customers. Managers in business categories such as producers, forwarding agents, and selling agents that handle material objects distributed by a number of business categories as described above analyzes material object information stored in their respective databases in order to improve CRM services.

While a producer, forwarding agent, and selling agent that handle material objects distributed by a plurality of business categories analyze the material object information stored in their respective databases in order to improve their services as described above, it is difficult to improve CRM services concerning an material object distributed through the plurality of business categories because, besides factors in each category, factors in different categories may affect customer's evaluation and the sales of the material object.

Suppose that apple C produced at temperature B by farm A is transported by forwarding agent D to selling agent E and, F days after the arrival at selling agent E, sold to consumer G, for example. If apple C is rated low by consumer G, it is difficult for the producer, forwarding agent, or selling agent to individually determine which of temperature B during production, the way apple C is transported by forwarding agent D, the F-days-after-selling sales, and other causes the low rating should be attributed to, by using only information in their databases in the respective business categories.

On the other hand, it is difficult to integrate information stored in the databases in the different business categories such as a producer, forwarding agent, and selling agent, because no key is available for associating information in a database with information in another database. Therefore it is impossible to identify which record in a database corresponds to which record in another database. In addition, the different databases use different formats.

SUMMARY OF THE INVENTION

It is an object of the present invention to solve these problems and provide a technology that enables material object information in a plurality of categories of business to be used.

The present invention provides a database integration management system for managing integrated material-object information into which information in a number of business categories through which the material objects are distributed is integrated, wherein a plurality of items of information are integrated and managed by using identification codes of individual material objects and integrated material-object information is provided to users in the business categories.

In the database integration management system according to the present invention, a non-contact tag on which an identification code is stored for identifying a material object is attached to the material object or its container and different business categories such as a producer, forwarding agent, selling agent, and questionnaire survey agent that handle the material object associate the material object identification code read from the tag attached to the material object with information about the material object identified by the identification code and store them in their own material-object information databases in their own material-object information storing apparatuses when they handle the material object, and use the material-object storing apparatuses to manage the material object information independently in the business categories.

After the material object is shipped, transported, or sold, or a questionnaire survey about the material object is completed, or if a request is provided from a database integration management apparatus, the material-object identification code and material object information stored in the above-mentioned material-object information database are transferred from the material-object information storing apparatus to the database integration management apparatus.

The database integration management apparatus receives the material-object identification codes and material object information sent from the material-object information storing apparatuses of the producer, forwarding agent, selling agent, and questionnaire survey agent, integrates material object information associated with the same material-object identification code among the received material-object identification codes and material object information to generate integrated material-object information, then associates the material-object identification code with the integrated material-object information identified by the identification code and store them in an integrated database of the database integration management apparatus.

When producer, forwarding agent, selling agent, and other agents in different business categories that handle the material object want to use the above-described integrated material-object information to provide fine CRM services, they request the database integration management apparatus through the material-object information storing apparatus to send integrated material-object information associated with a given material-object identification code.

The database integration management apparatus receives the request for sending the integrated material-object information associated with the material-object identification code from the material-object information storing apparatuses, reads the requested integrated material-object information from the integrated database, and sends it to the requester of the integrated material-object information.

The material-object information storing apparatuses of the producer, forwarding agent, and selling agent receives the sent integrated material object information and output it to an output device. A person in each business category can determine the reason why a material object is rated highly or low by customers based on the results of a questionnaire output on the output device as integrated information and use the results of the determination to improve CRM services.

According to the database integration management system of the present invention, a plurality of items of material object information is integrated and managed by using material-object identification codes of individual material objects and integrated material-object information is provided to the users in different business categories as described above, thus material object information can be used across a plurality of business categories.

BRIEF DESCRIPTION OF THE DRAWINGS

FIG. 13 is an example of producer's database 308 according to the embodiment.

FIG. 19 shows an example of a forwarding agent's database 408 according to the embodiment.

FIG. 25 shows an example of selling agent's database 508 according to the embodiment.

FIG. 29 shows an example of questionnaire survey agent's database 608 according to the embodiment.

FIG. 31 shows an example of an integrated database 208 according to the embodiment.

DETAILED DESCRIPTION OF THE EMBODIMENTS

An embodiment of a database integration management system will be described below in which a tag on which a material-object identification code for identifying an individual material object, which is an apple, is attached to the material object or its container to manage integrated material-object information into which a plurality of items of material-object information about the apples identified by the material-object identification code are integrated.

Figure 1:
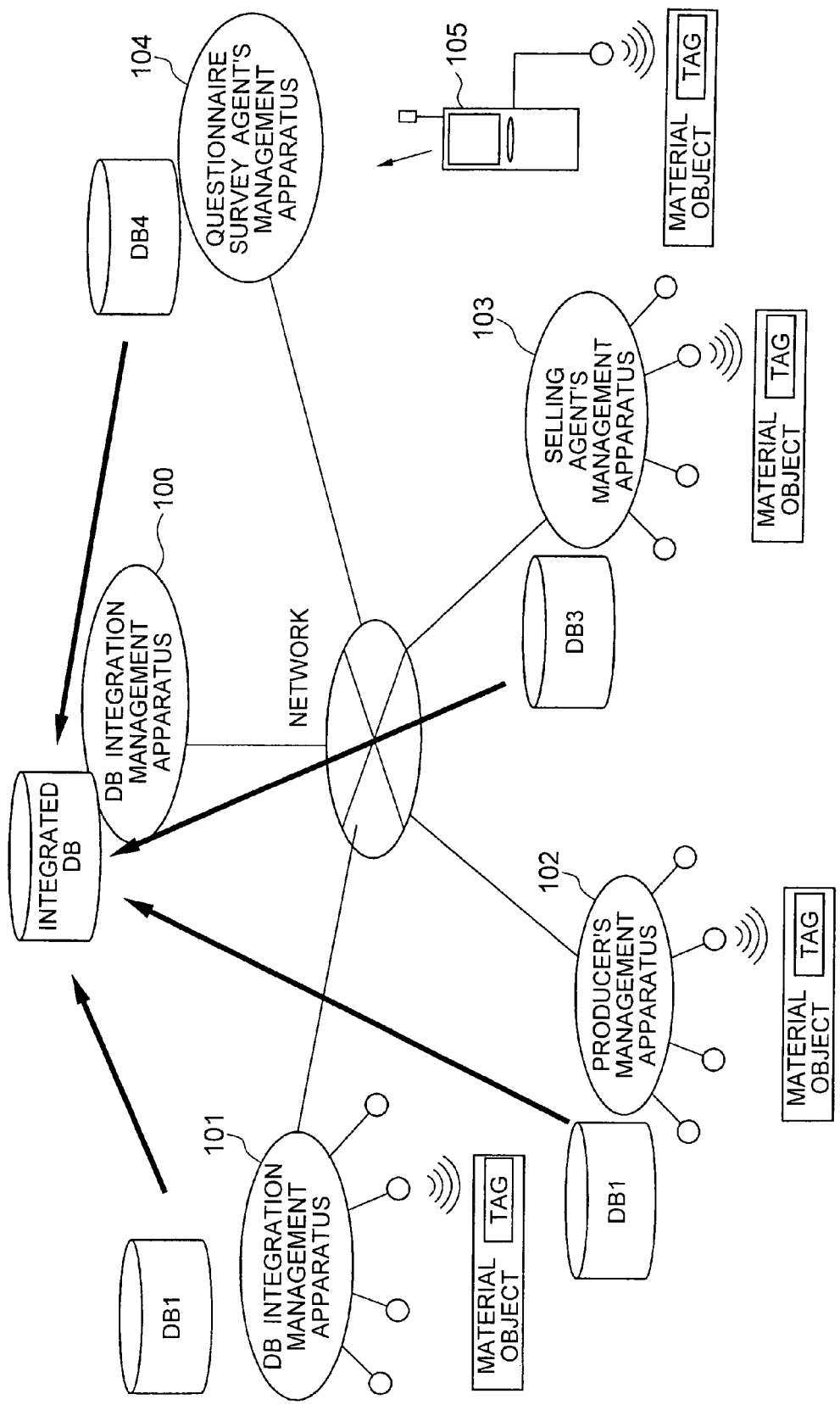
FIG. 1 shows a general view of a database integration management system according to an embodiment.

FIG. 1 shows a general configuration of the database integration management system according to the present embodiment. As shown in FIG. 1, the database integration management system of the present embodiment comprises a database integration management apparatus 100, producer's management apparatus 101, forwarding agent's management apparatus 102, selling agent's management apparatus 103, questionnaire survey agent's management apparatus 104, and consumer's mobile phone 105.

The database integration management apparatus 100 is a processing apparatus that integrates a material-object identification code and material object information sent from a material-object information database in each business category to generate integrated material-object information and associates the material-object identification code with the integrated material-object information identified by the material-object identification code to store them in an integrated database.

The producer's management apparatus 101 is a material-object storing apparatus for storing material-object identification codes of apples produced by the producer, environmental information, and shipment information in producer's database and sending these items of information to the database integration management apparatus 100 as producer information.

The forwarding agent's management apparatus 102 is a material-object storing apparatus for storing the material-object identification codes of the apples forwarded by the forwarding agent, collection information, forwarding information, and selling information in forwarding agent's database and sending these items of information to the database integration management apparatus 100 as forwarding agent information.

The selling agent's management apparatus 103 is a material-object storing apparatus for storing the material-object identification codes of the apples sold by the selling agent, receipt information, display information, and sales information in selling agent's database and sending these items of information to the database integration management apparatus 100 as selling agent information.

The questionnaire agent's management apparatus 104 is a material-object storing apparatus for storing the material-object identification codes of the apples, evaluation information and comments collected by the questionnaire survey agent in questionnaire survey agent's database and sending these items of information to the database integration management apparatus 100 as consumer information.

The consumer's mobile phone 105 is an information processing apparatus such as a mobile phone for reading the material-object identification codes of an apple bought by the consumer, accepting evaluation and a comment about the apple input by the consumer, and sending them to the questionnaire survey agent's management apparatus 104.

Figure 2:
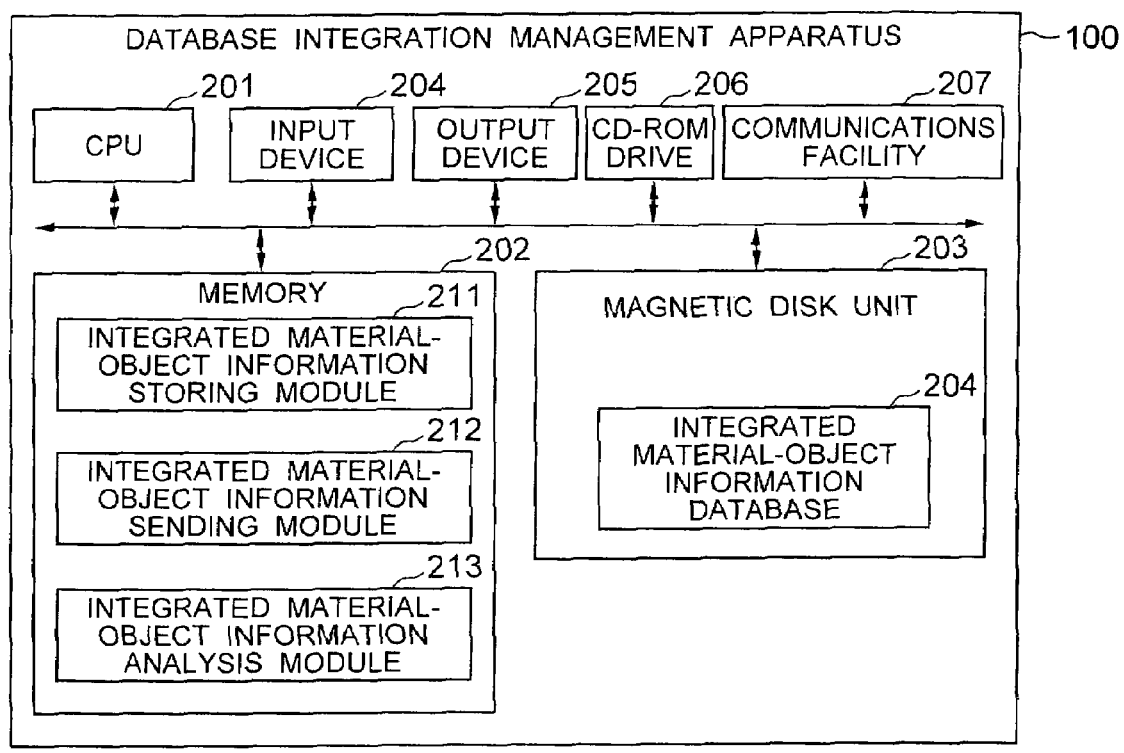
FIG. 2 shows a general configuration of a database integration management apparatus 100 according to the embodiment.

FIG. 2 shows a general configuration of the database integration management apparatus 100 according to the present invention. As shown in FIG. 2, the database integration management apparatus 100 comprises a CPU 201, memory 202, magnetic disk unit 203, input device 204, output device 205, CD-ROM drive 206, communications facility 207, and integrated database 208.

The CPU 201 controls the operation of the entire database integration management apparatus 100. The memory 202 is a storage device into which processing programs and data for controlling the operation of the entire database integration management apparatus 100 are loaded.

The magnetic disk unit 203 is a storage device for storing the above-mentioned processing programs and data. The input device 204 is used for inputting various kinds of data for generating integrated material-object information into which the material-object identification code and material-object information sent from the material-object information database in each business category are integrated.

The output device 205 outputs various kinds of data provided by the generation of the above-mentioned integrated material-object information. The CD-ROM drive 206 is used for reading data from a CD-ROM on which the above-mentioned processing programs are recorded. The communications facility 207 is used for communicating with other processing apparatuses through a network such as the Internet and an intranet. The integrated database 208 is a database for storing integrated material-object information into which material-object identification codes and material object information sent from material-object information databases in the business categories are integrated.

The database integration management apparatus 100 further comprises an integrated material-object information storing module 211, integrated material-object information sending module 212, and integrated material-object information analysis module 213.

The integrated material-object information storing module 211 is a processing module for integrating material-object information having the same material-object identification code out of material-object identification codes and producer information received from the producer's management apparatus 101, material-object identification codes and forwarding agent information received from the forwarding agent's management apparatus 102, material-object identification codes and selling agent information received from the selling agent's management apparatus 103, and material-object identification codes and customer information received from the questionnaire survey agent's management apparatus 104 to generate integrated material-object information and associating the material-object identification code with integrated material-object information identified by the identification code and storing them in the integrated database 208.

The integrated material-object information sending module 212 is a processing module for receiving a request for sending integrated material-object information associated with a given material-object identification code from the producer's management apparatus 101, forwarder's management apparatus 102, selling agent's management apparatus 103, or consumer's mobile phone 105 and reading the requested integrated material-object information from the integrated database 208 to send it to the requester from the database integration management apparatus 100.

The integrated material-object information analysis module 213 is a processing module for analyzing a material-object information associated highly with any evaluation information or sales information concerning the apple, which is contained in the above-described integrated material-object information and sending the results to a requester.

A program for causing the database integration management apparatus 100 to function as the integrated material-object information storing module 211, integrated material-object information sending module 212, and integrated material-object information analysis module 213 is recorded on a recording medium such as a CD-ROM and stored in a medium such as a magnetic disk, then loaded into memory and executed. The recording medium storing the program is not limited to the CD-ROM, instead any recording medium may be used.

Figure 3:
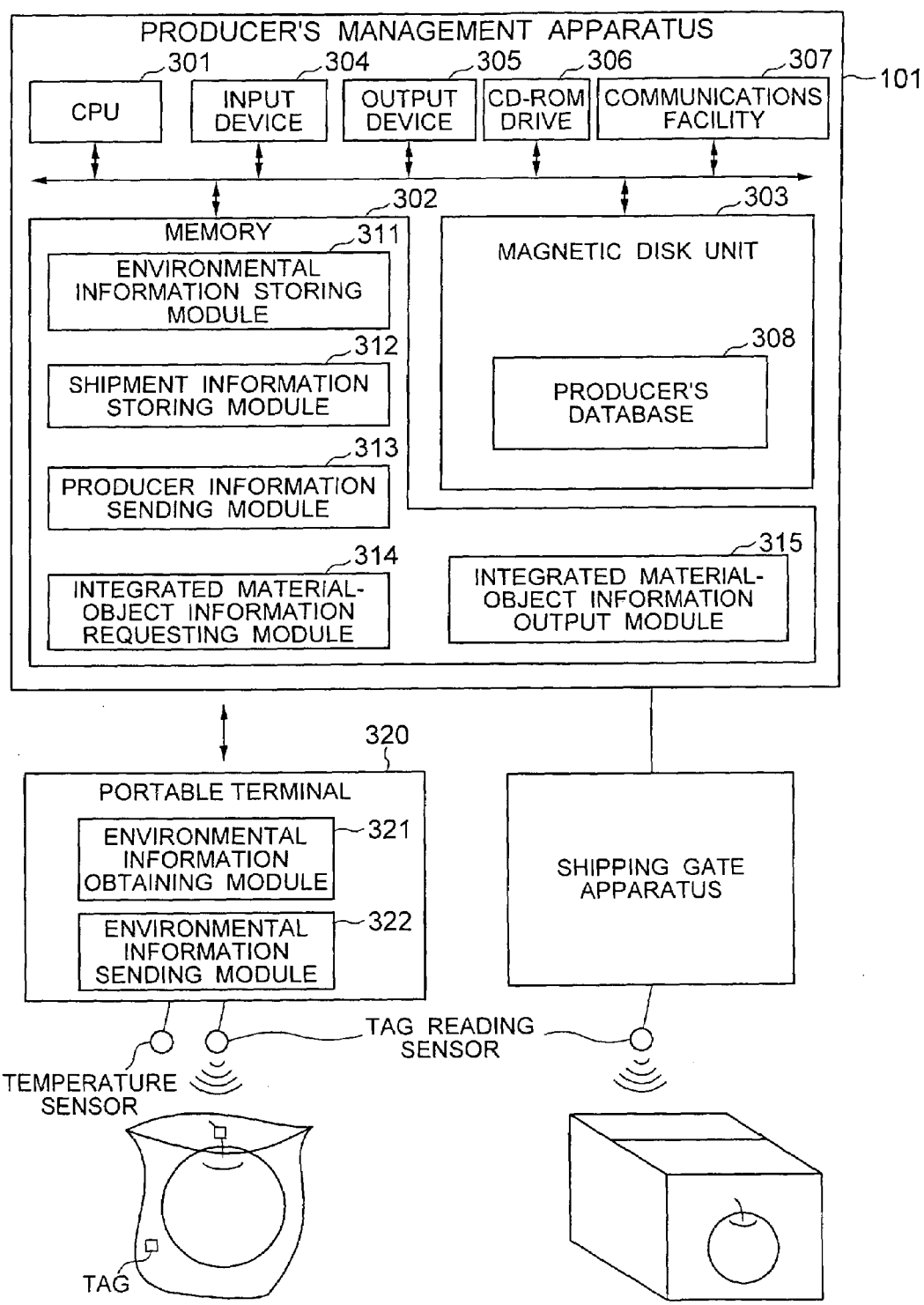
FIG. 3 shows a general configuration of a producer's management apparatus 101 according to the embodiment.

FIG. 3 shows a general configuration of the producer's management apparatus 101 according to the present embodiment. As shown in FIG. 3, the producer's management apparatus 101 of the present embodiment comprises a CPU 301, memory 302, magnetic disk unit 303, input device 304, output device 305, CD-ROM drive 306, communications facility 307, producer's database 308, and portable terminal 320.

The CPU 301 controls the operation of the entire producer's management apparatus 101. The memory 302 is a storage device into which processing programs and data for controlling the operation of the entire producer's management apparatus 101 are loaded.

The magnetic disk unit 303 is a storage device for storing the above-mentioned processing programs and data. The input device 304 is used for performing various input operations for storing the material-object identification codes of apples produced by the producer, environmental information, and shipment information in the producer's database 308 and sending these items of information to the database integration management apparatus 100 as producer information.

The output device 305 performs various output operations involved in storing and sending the producer information. The CD-ROM drive 306 is a device for reading data from a CD-ROM on which the above-mentioned processing programs are recorded. The communications facility 307 is a device for communicating other processing apparatuses through a network such as the Internet or an intranet.

The producer's database 308 is a database for storing the material-object identification codes of apples produced by the producer, environmental information, and shipment information. The portable terminal 320 is used for collecting environmental information concerning individual apples and sending it to the producer's management apparatus 101.

The producer's management apparatus 101 further comprises an environmental information storing module 311, shipment information storing module 312, producer information sending module 313, integrated material-object information requesting module 314, and integrated material-object information output module 315.

The environmental information storing module 311 is a processing module for receiving environmental information sent from the portable terminal 320 and storing it in the producer's database 308. The shipment information storing module 312 is a processing module for reading a material-object identification code from a tag attached to an apple passing through a shipping gate and storing shipment information that indicates the shipping date and time of the apple identified by the read material-object identification code in the producer's database 308.

The producer information sending module 313 is a processing module for sending the material-object identification code, environmental information, and shipment information stored in the producer's database 308 to the database integration management apparatus 100 as the producer information. The integrated material-object information requesting module 314 is a module for requesting the database integration management apparatus 100 to send integrated material-object information associated with the material-object identification code stored in the producer's database 308. The integrated material-object information output module 315 is a processing module for receiving the requested integrated material-object information from the database integration management apparatus 100 and outputting it.

A program for causing the producer's management apparatus 101 to function as the environmental information storing module 311, shipment information storing module 312, producer information sending module 313, integrated material-object information requesting module 314, and integrated material-object information output module 315 is recorded on a recording medium such as a CD-ROM and stored in a medium such as a magnetic disk, then loaded into memory and executed. The recording medium storing the program is not limited to the CD-ROM, instead any recording medium may be used.

The portable terminal 320 comprises an environmental information obtaining module 321 and environmental information sending module 322. The environmental information obtaining module 321 is a processing module for reading a material-object identification code for identifying an apple from a tag attached to the apple, detecting sensor information indicating the temperature of the surface of the apple as the environmental information about the apple, and storing the detected sensor information in the portable terminal 320 as the environmental information about the apple identified by the read material-object identification code. The environmental information sending module 322 is a module for sending the environmental information identified by the material-object identification code from the portable terminal 320 to the producer's management apparatus 101.

A program for causing the portable terminal 320 to function as the environmental information obtaining module 321 and environmental information sending module 322 is recorded on a recording medium such as ROM and executed. The recording medium storing the program is not limited to the CD-ROM, instead any recording medium may be used.

Figure 4:
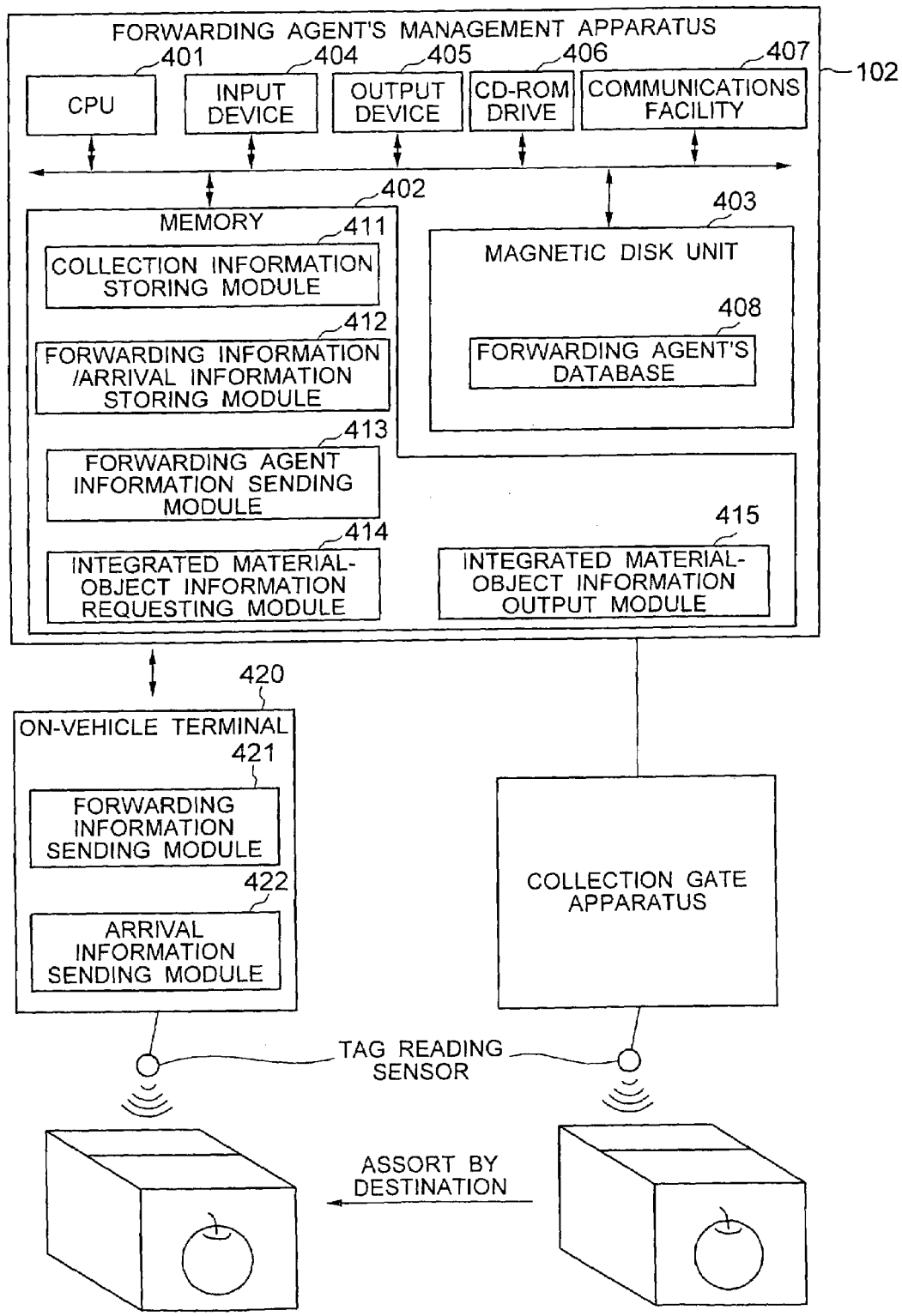
FIG. 4 shows a general configuration of a forwarding agent's management apparatus 102 according to the embodiment.

FIG. 4 shows a general configuration of the forwarding agent's management apparatus 102 according to the present embodiment. As shown in FIG. 4, the forwarding agent's management apparatus 102 comprises a CPU 401, memory 402, magnetic disk unit 403, input device 404, output device 405, CD-ROM drive 406, communications facility 407, forwarding agent's database 408, and on-vehicle terminal 402.

The CPU 401 controls the operation of the entire forwarding agent's management apparatus 102. The memory 402 is a storage device into which processing programs and data are loaded for controlling the operation of the entire forwarding agent's management apparatus 102.

The magnetic disk unit 403 is a storage device for storing the above-mentioned processing programs and data. The input device 404 is used for performing various input operations for storing the material-object identification codes of apples transported by the forwarding agent, collection information, forwarding information, and selling information in the forwarding agent's database 408 and sending these items of information to the database integration management apparatus 100 as forwarding agent's information.

The output device 405 performs various output operations involved in storing and sending the forwarding agent information. The CD-ROM drive 406 is a device for reading data from a CD-ROM on which the above-mentioned processing programs are recorded. The communications facility 407 is a device for communicating other processing apparatuses through a network such as the Internet or an intranet.

The forwarding agent's database 408 is a database for storing the material-object identification code of apples transported by the forwarding agent, collection information, forwarding information, and selling information. The on-vehicle terminal 420 is used for sending the forwarding information and selling information to the forwarding agent's management apparatus 102.

The forwarding agent's management apparatus 102 further comprises a collection information storing module 411, forwarding information/selling information storing module 412, forwarding agent information sending module 413, integrated material-object information requesting module 414, and integrated material-object output module 415.

The collection information storing module 411 is a processing module for storing the collection information about apples collected at a distribution center in the forwarding agent's database 408. The forwarding information/selling information storing module 412 is a processing module for receiving the forwarding information and selling information sent form the on-vehicle terminal 420 installed in a transportation vehicle and storing it in the forwarding agent's database 408.

The forwarding agent information sending module 413 is a processing module for sending the material-object identification code, collection information, forwarding information, and selling information stored in the forwarding agent's database 408 to the database integration management apparatus 100 as the forwarding agent information.

The integrated material-object information requesting module 414 is a processing module for requesting the database integration management apparatus 100 to send integrated material-object information associated with a material-object identification code stored in the forwarding agent's database 408. The integrated material-object information output module 415 is a processing module for receiving the integrated material-object information that the requesting module 414 requests from the database integration management apparatus 100 and outputting it.

A program for causing the forwarding agent's management apparatus 102 to function as the collection information storing module 411, forwarding information/selling information storing module 412, forwarding agent information sending module 413, integrated material-object information requesting module 414, and integrated material-object information output module 415 is recorded on a recording medium such as a CD-ROM and stored in a medium such as a magnetic disk, then loaded into memory and executed. The recording medium storing the program is not limited to the CD-ROM, instead any recording medium may be used.

The on-vehicle terminal 420 comprises a forwarding information sending module 421 and selling information sending module 422. The forwarding information sending module 421 is a processing module for reading the material-object identification code of apples loaded on the transportation vehicle and sending forwarding information indicating the apples transported by the transportation vehicle to the forwarding agent's management apparatus 102. The selling information sending module 422 is a processing module for sending selling information indicating that the apples loaded on the transportation vehicle arrived at their destination when the vehicle arrived at the destination to the forwarding agent's management apparatus 102.

A program for causing the on-vehicle terminal 420 to function as the forwarding information sending module 421 and selling information sending module 422 is recorded on a recording medium such as ROM and executed. The recording medium is not limited to the ROM, instead any other recording media may be used.

Figure 5:
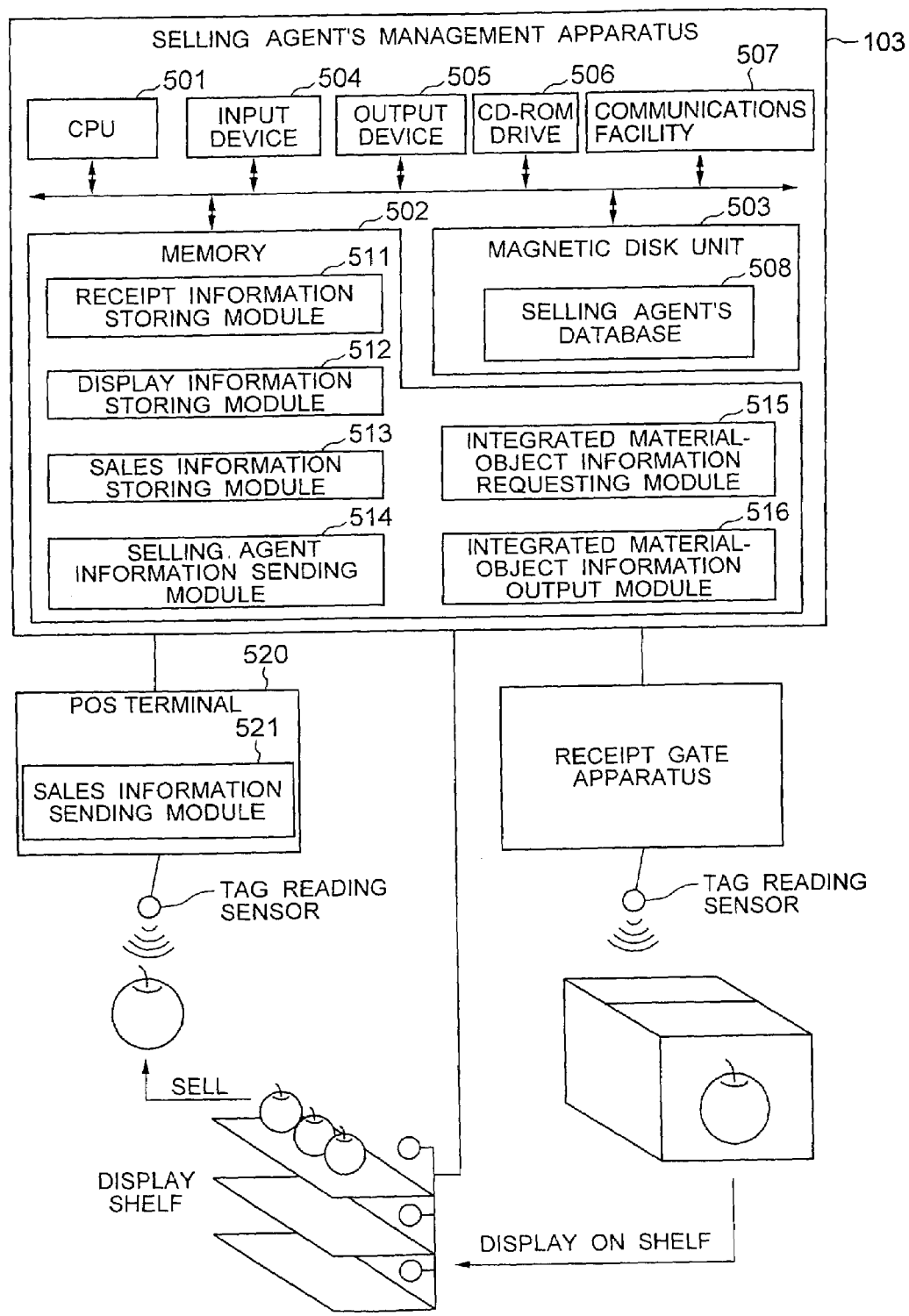
FIG. 5 shows a general configuration of a selling agent's management apparatus 103 according to the embodiment.

FIG. 5 shows a general configuration of the selling agent's management apparatus 103 according to the present embodiment. As shown in FIG. 5, the selling agent's management apparatus 103 comprises a CPU is 501, memory 502, magnetic disk unit 503, input device 504, output device 505, CD-ROM drive 506, communications facility 507, selling agent's database 508, and POS terminal 520.

The CPU 501 controls the operation of the entire selling agent's management apparatus 103. The memory 502 is a storage device into which processing programs and data are loaded for controlling the operation of the entire selling agent's management apparatus 103.

The magnetic disk unit 503 is a storage device for storing the above-mentioned processing programs and data. The input device 504 is used for performing various input operations for storing the material-object identification code of apples sold by the selling agent, receipt information, display information, and sales information in the selling agent's database 508 and sending these items of information to the database integration management apparatus 100 as selling agent information.

The output device 505 performs various output operations involved in storing and sending the selling agent information. The CD-ROM drive 506 is a device for reading data from a CD-ROM on which the above-mentioned processing programs are recorded. The communications facility 507 is a device for communicating other processing apparatuses through a network such as the Internet or an intranet.

The selling agent's database 508 is a database for storing the material-object identification code of apples sold by the selling agent, receipt information, display information, and sales information. The POS terminal 520 is used for calculating the amount charged for goods bought by a consumer and sending sales information about the apples sold by the selling agent to the selling agent's management apparatus 103.

The selling agent's management apparatus 103 further comprises a receipt information storing module 511, display information storing module 512, sales information storing module 513, selling agent information sending module 514, integrated material-object information requesting module 515, and integrated material-object information output module 516.

The receipt information storing module 511 is a processing module for reading the material-object identification code of apples arrived at the selling agent and storing receipt information indicating the date and time of the receipt of the apples at the selling agent's database 508. The display information storing module 512 is a processing module for reading the material-object identification code of the apples displayed at the selling agent and storing display information indicating the display position of the apples to the selling agent's database 508.

The sales information storing module 513 is a processing module for receiving sales information sent from the POS terminal 520 and storing it in the selling agent's database 508. The selling agent information sending module 514 is a processing module for sending the material-object identification code, receipt information, display information, and sales information stored in the selling agent's database 508 to the database integration management apparatus 100 as the selling agent information.

The integrated material-object information requesting module 515 is a processing module for requesting the database integration management apparatus 100 to send integrated material-object information associated with a material-object identification code stored in the selling agent's database 508. The integrated material-object information output module 516 is a processing module for receiving the integrated material-object information that the requesting module 515 requested from the database integration management apparatus 100 and outputting it.

A program for causing the selling agent's management apparatus 103 to function as the receipt information storing module 511, display information storing module 512, sales information storing module 513, selling agent information sending module 514, integrated material-object information requesting module 515, and integrated material-object information output module 516 is recorded on a recording medium such as a CD-ROM and stored in a medium such as a magnetic disk, then loaded into memory and executed. The recording medium storing the program is not limited to the CD-ROM, instead any recording medium may be used.

The POS terminal 520 comprises a sales information sending module 521. The sales information sending module 521 is a processing module for reading the material-object identification code of apples sold by the selling agent and sending sales information indicating the date and time of the sales of the apples to the selling agent's management apparatus 103.

A program for causing the POS terminal 520 to function as the sales information sending module 521 is recorded on a recording medium such as a CD-ROM and stored in a medium such as a magnetic disk, then loaded into memory and executed. The recording medium storing the program is not limited to the CD-ROM, instead any recording medium may be used.

Figure 6:
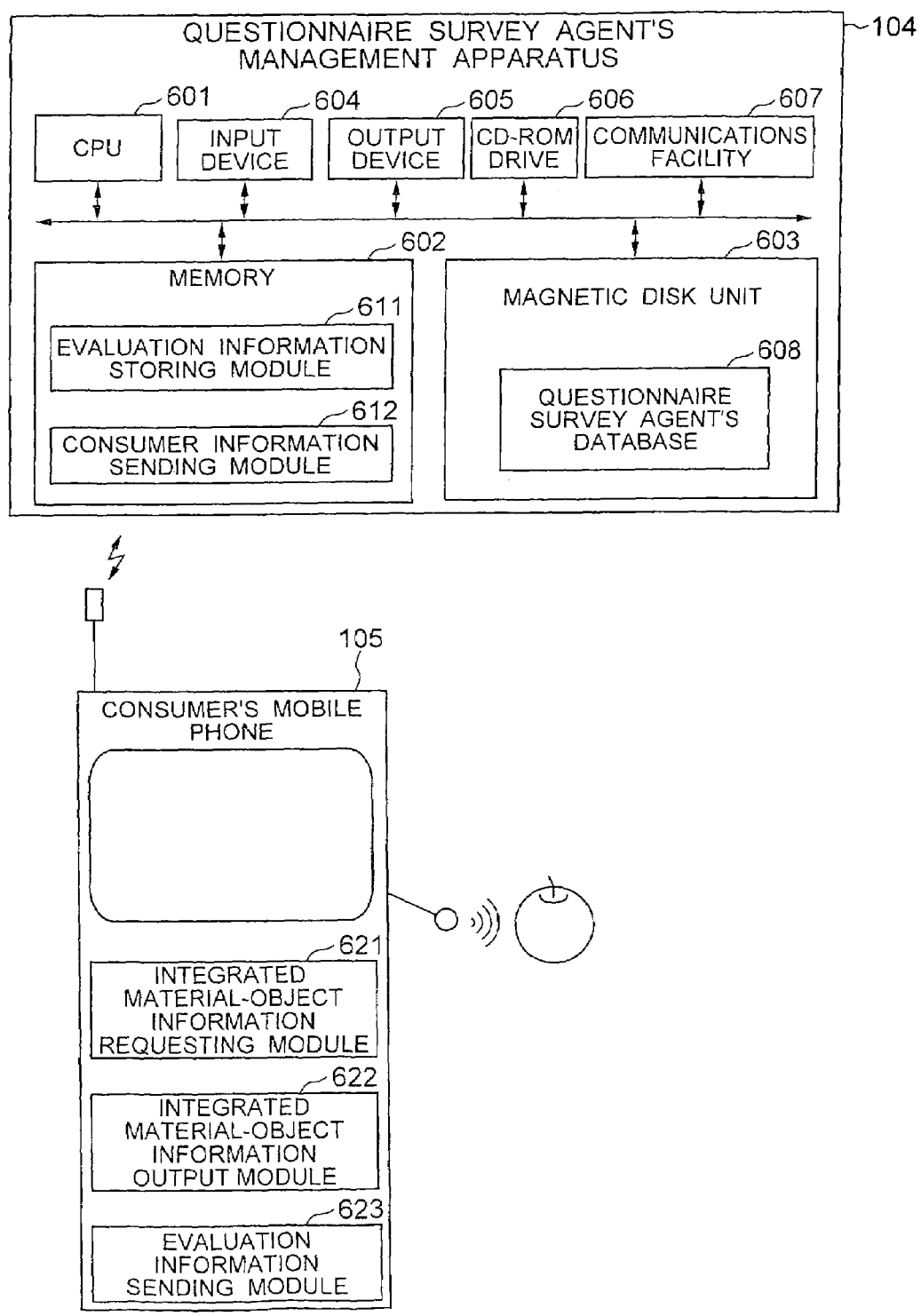
FIG. 6 shows a general configuration of a questionnaire survey agent's management apparatus 104 according to the embodiment.

FIG. 6 shows a general configuration of the questionnaire survey agent's management apparatus 104 according to the present invention. As shown in FIG. 6, the questionnaire survey agent's management apparatus 104 comprises a CPU 601, memory 602, magnetic disk unit 603, input device 604, output device 605, CD-ROM drive 606, communications facility 607, and questionnaire survey agent's database 608.

The CPU 601 controls the operation of the entire questionnaire survey agent's management apparatus 104. The memory 602 is a storage device into which processing programs and data are loaded for controlling the operation of the entire questionnaire survey agent's management apparatus 104.

The magnetic disk unit 603 is a storage device for storing the above-mentioned processing programs and data. The input device 604 is used for performing various input operations for storing the material-object identification code of apples, evaluation information, and comments collected by the questionnaire survey agent in the questionnaire survey agent's database 608 and sending these items of information to the database integration management apparatus 100 as consumer information.

The output device 605 performs various output operations involved in storing and sending the consumer information. The CD-ROM drive 606 is a device for reading data from a CD-ROM on which the above-mentioned processing programs are recorded. The communications facility 607 is a device for communicating other processing apparatuses through a network such as the Internet or an intranet. The questionnaire survey agent's database 608 is a database for storing the material-object identification code, evaluation information, and comments collected by the questionnaire survey agent.

The questionnaire agent's management apparatus 104 further comprises an evaluation information storing module 611 and consumer information sending module 612. The evaluation information storing module 611 is a processing module for receiving evaluation information and comments sent from a consumer's mobile phone 105 and storing them in the questionnaire survey agent's database 608. The consumer information sending module 612 is a processing module for sending the material-object identification code, evaluation information, and comments stored in the questionnaire survey agent's database 608 to the database integration management apparatus 100 as consumer information.

A program for causing the questionnaire survey agent's management apparatus 104 to function as the evaluation information storing module 611 and consumer information sending module 612 is recorded on a recording medium such as a CD-ROM and stored in a medium such as a magnetic disk, then loaded into memory and executed. The recording medium storing the program is not limited to the CD-ROM, instead any recording medium may be used.

The consumer's mobile phone 105 comprises an integrated material-object information requesting module 621, integrated material-object information output module 622, and evaluation information sending module 623.

The integrated material-object information requesting module 621 is a processing module for reading the material-object identification code of the apples displayed in the selling agent through a sensor contained in the consumer's mobile phone 105 and requesting the database integration management apparatus 100 to send integrated material-object information identified by the material-object identification code from the consumer's mobile phone 105.

The integrated material-object information output module 622 is a processing apparatus for receiving the integrated material-object information sent form the database integration management apparatus 100 and displaying it on the screen of the consumer's mobile phone 105. The evaluation information sending module 623 is a processing module for reading the material-object identification code of apples bought by a consumer, accepting evaluation and comments about the apples that are input by the consumer, and sending it from the consumer's mobile phone 105 to the questionnaire survey agent's management apparatus 104.

A program for causing the consumer's mobile phone 105 to function as the integrated material-object information requesting module 621, integrated material-object information output module 622, and evaluation information sending module 623 is recorded on a recording medium such as ROM and executed. The recording medium storing the program is not limited to the ROM, instead any recording medium may be used.

Figure 7:
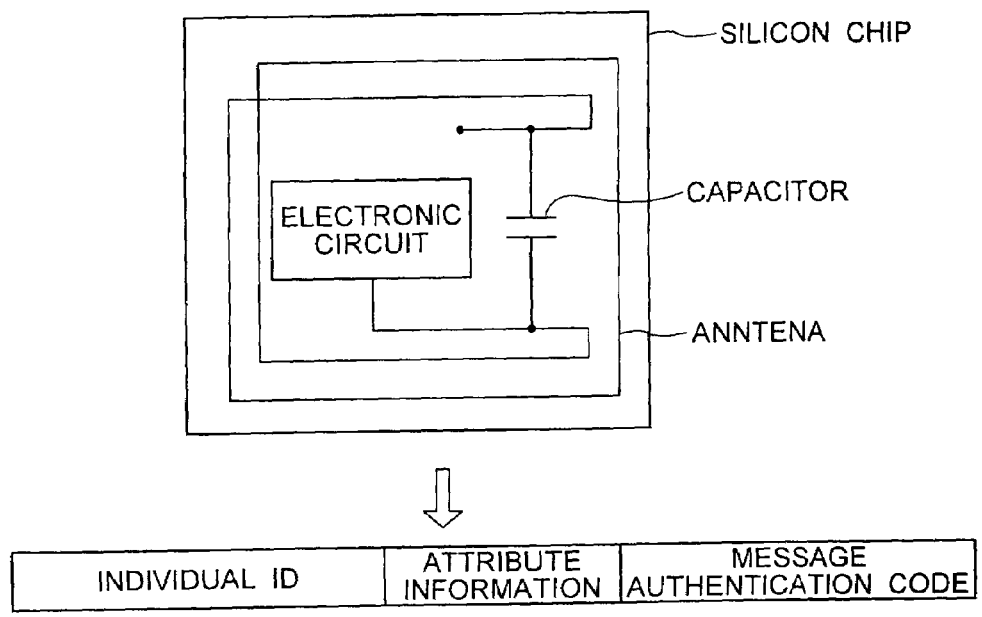
FIG. 7 shows a schematic diagram of an electronic circuit chip attached to a tag according to the embodiment.

FIG. 7 shows a general configuration of an electronic circuit chip contained in a tag according to the present embodiment. The electronic circuit chip contained in the tag of the present embodiment may be a small electronic circuit chip about 0.3 mm per side that can be fabricated by only those semiconductor manufacturers that have adequate equipment and has the shape of a thin, generally rectangular solid. Therefore the electronic circuit chip can be attached to many material objects such as contact lenses and bills that are currently distributed. It can be attached directly to an individual material object or to wrapping paper that wraps the material object as shown in FIG. 3 and can be used as a tag for identifying the material object. A barcode is difficult to be printed on a material object of indefinite shape and difficult to be read from paper on which the barcode is printed if the paper is wrinkled. If an electronic circuit chip larger than 0.3 m per side, 1.0 mm for example, is used, the chip can come off due to the bending of a material object to which it is attached during distribution across a number of business categories.

Memory, an electronic circuit for reading data from the memory, capacitor, and antenna are formed on a silicon chip as shown in FIG. 7. When a radio wave is provided from an external source, an electric current is induced at the antenna and electric charge is stored in the capacitor. Electric power provided by the electric charge is used to send information stored in the electronic circuit from the antenna in a non-contact manner. The memory of the electronic circuit contains an individual identification code, attribute information for classifying the individual identification code, and message authentication code (MAC) generated by using different encryption keys for different pieces of attribute information to perform a predetermined calculation on the individual identification code and attribute information. In the present embodiment, information such as the individual identification code may be encrypted by using a different encryption key for each channel through which a material object is distributed and a decryption key is shared between only material-object information storing apparatuses in which information about the material-object is stored to prevent other material-object information storing apparatuses from reading the individual identification code.

Described below is a process for integrating information obtained from a producer, forwarding agent, selling agent, and consumer when apples produced by a producer of a farm are transported by the forwarding agent to the selling agent and sold to the consumer by the selling agent in a database integration management system according to the present invention.

In the database integration management system of the present embodiment, a portable terminal 320 of the producer producing apples determines and stores environmental information such as temperatures during the production of the apples.

Figure 8:
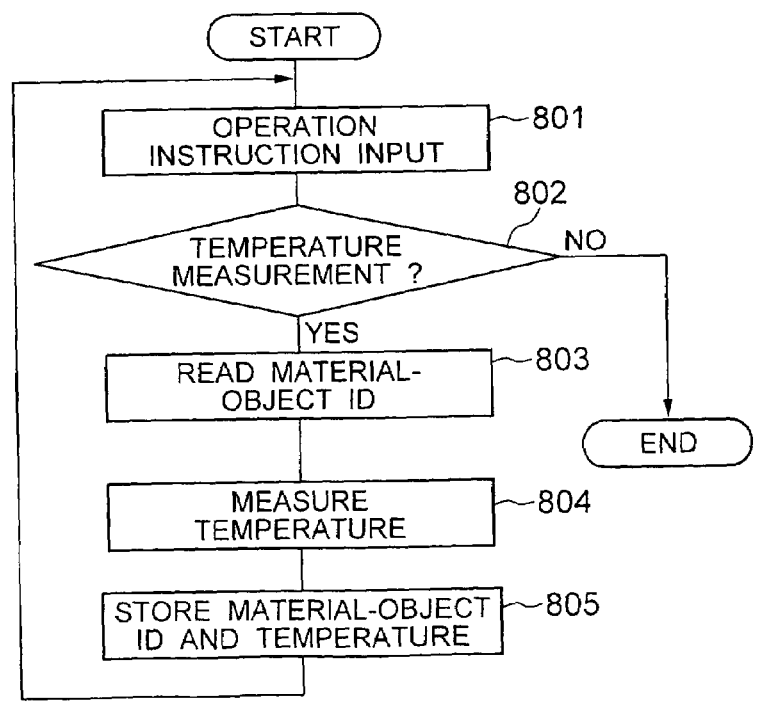
FIG. 8 is a flowchart showing the procedure of an environmental information obtaining process according to the embodiment.

FIG. 8 shows a flowchart of the procedure of a process for obtaining the environmental information according to the present embodiment. An environmental information obtaining module 321 of the portable terminal 320 shown in FIG. 8 performs the process for reading a material-object identification code for identifying an apple from a tag attached to the apple to detect sensor information indicating an ambient temperature around the apple as the environmental information about the apple, and storing the detected sensor information in the portable terminal 320 as the temperature information about the apple identified by the read material-object identification code.

At step 801, the environmental information obtaining module 321 of the portable terminal 320 receives an input instructing an operation from a user operating the portable terminal 320. It is determined whether the received instructed operation is the measurement of the ambient temperature around an apple at step 802. If the instructed operation is the measurement of the temperature of the apple, then the process proceeds to step 803.

At step 803, a radio wave is sent to a tag attached to the apple the ambient temperature around which is to be measured to drive an electronic circuit chip installed on the tag and a material-object identification code sent from the electronic circuit chip is read. The sensor information in a temperature sensor of the portable terminal 320 is detected to measure the ambient temperature around the apple at step 804. The read material-object identification code and the information about the measured temperature are stored in the portable terminal 320 at step 805, then the process returns to step 801.

After a certain amount of information about measured temperature is stored in the portable terminal 320 of the present embodiment, the portable terminal connects to the producer's management apparatus 101 through an interface such as a USB (Universal Serial Bus) and sends the information stored in the portable terminal 320 to the producer's management apparatus 101.

Figure 9:
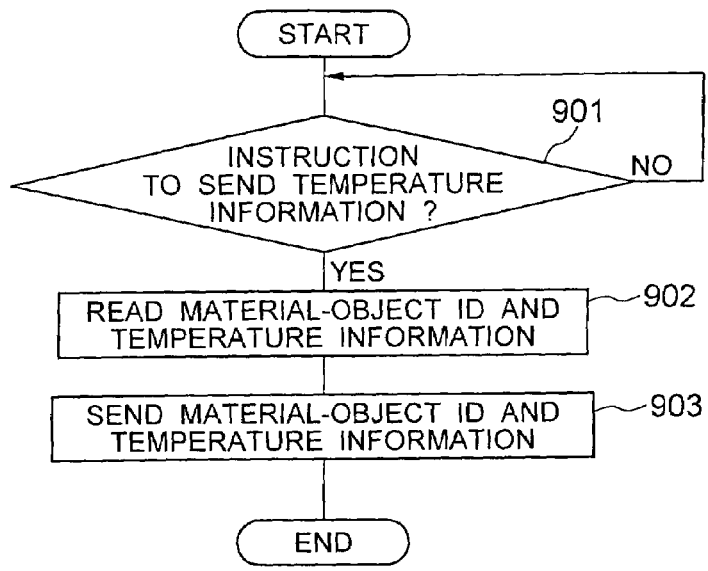
FIG. 9 is a flowchart showing the procedure of an environmental information sending process according to the embodiment.

FIG. 9 shows a flowchart of the procedure of an environmental information sending process according to the present embodiment. As shown in FIG. 9, an environmental information sending module 322 of the portable terminal 320 performs the process for sending temperature information identified by a material-object identification code from the portable terminal 320 to the producer's management apparatus 101.

The environmental information sending module 322 of the portable terminal 320 determines whether or not an instruction to send temperature information is received from the producer's management apparatus 101 at step 901. If it is determined that the instruction for sending the temperature information is received, the process proceeds to step 902.

At step 902, the material-object identification code and temperature information stored in the portable terminal 320 are read. Then the read material-object identification code and temperature information are sent to the producer's management apparatus 101 at step 903.

Figure 10:
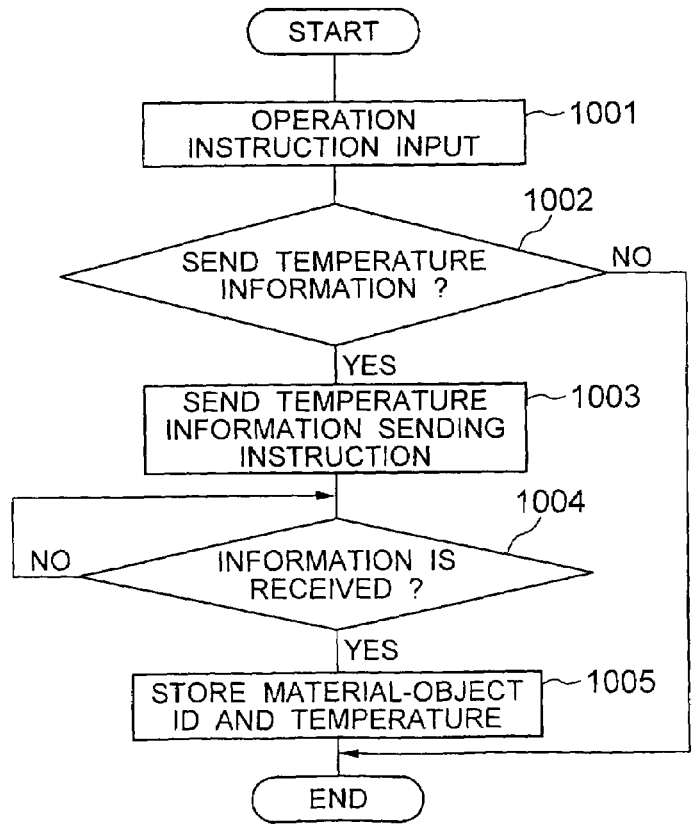
FIG. 10 is a flowchart showing the procedure of an environmental information storing process according to the embodiment.

FIG. 10 shows a flowchart of the procedure of an environmental information storing process according to the present embodiment. As shown in FIG. 10, an environmental information storing module 311 of the producer's management apparatus 101 performs the process for receiving the environmental information sent from the portable terminal 320 and storing it in producer's database 308.

At step 1001, the environmental information storing module 311 of the producer's management apparatus 101 accepts an input instructing an operation from a user operating the producer's management apparatus 101. It is determined whether the operation instruction request the transmission of temperature information at step 1002. If the operation instruction requests the transmission of the temperature information, the process proceeds to step 1003.

At step 1003, the instruction for sending the temperature information is sent from the producer's management apparatus 101 to the portable terminal 302. At step 1004, it is determined whether the material-object identification code and temperature information stored in the portable terminal 320 is received from the portable terminal 320. If the material-object identification code and temperature information is received, the process proceeds to step 1005. At step 1005, the received material-object identification code and temperature information are stored in the producer's database 308.

Figure 11:
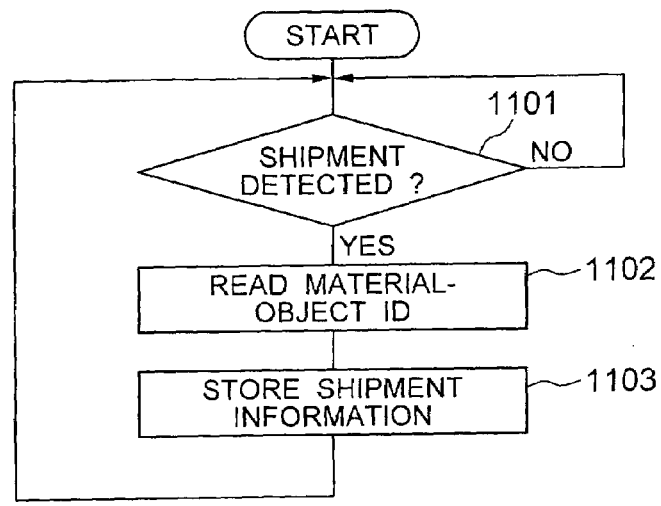
FIG. 11 is a flowchart showing the procedure of a shipment information storing process according to the embodiment.

FIG. 11 shows a flowchart of the procedure of a shipment information storing process according to the present embodiment. As shown in FIG. 11, a shipment information storing module 312 of the producer's management apparatus 101 performs the process for reading a material-object identification code from tags attached to apples when the apples produced are packed in a box and pass through a shipment gate and storing shipment information indicting the date and time of the shipment of the apples identified read material-object identification code in the producer's database 308.

The shipment information storing module 312 of the producer's management apparatus 101 determines whether the box containing the apples to be shipped is detected by a sensor installed at the shipment gate at step 1101. If the box containing the apples is detected, the process proceeds to step 1102.

At step 1102, a radio wave is sent to the tag attached to the apples contained in the box to drive an electronic circuit chip on the tag and read the material-object identification code sent from the electronic circuit chip. The read material-object identification code and the shipment information indicating the date of reading the material-object identification code are stored in the producer's database 308 at step 1103.

The producer's management apparatus 101 according to the present embodiment sends the material-object identification code, environmental information, and shipment information in the database integration management apparatus 100 when the apples produced is shipped and the material-object identification code is associated with the shipment information and stored in the producer's database 308.

Figure 12:
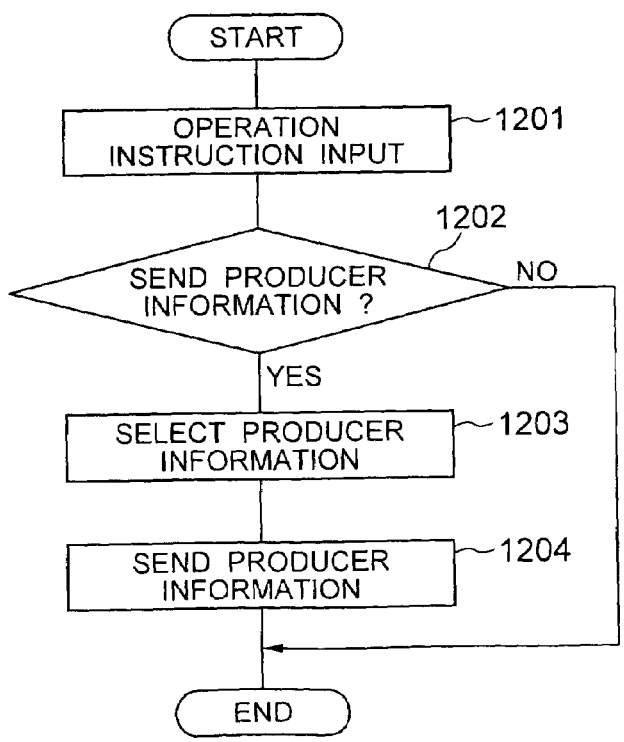
FIG. 12 is a flowchart showing a producer information sending process according to the embodiment.

FIG. 12 shows a flowchart showing the procedure of a producer information sending process according to the present embodiment. As shown in FIG. 12, a producer information sending module 313 of the producer's management apparatus 101 performs the process for sending the material-object identification code, environmental information, and shipment information stored in the producer's database 308 to the database integration management apparatus 100 as the producer information.

At step 1201, the producer information sending module 313 of the producer's management apparatus 101 accepts an input instructing an operation from a user operating the producer's management apparatus 101. At step 1202, it is determined whether or not the accepted operation instruction is an instruction for sending producer information. If it is determined that it is an instruction to send producer information, the process proceeds to step 1203.

At step 1203, producer information to be sent to the database integration management apparatus 100 is selected from material-object information stored in the producer's database 308. Previously sent data and confidential data such as those representing production costs are left out of this selection. It is assumed here that which information is confidential is separately defined in the producer's database 308.

At step 1204, the selected material-object identification code, environmental information, and shipment information is sent as the producer information together with a sender identification code indicating the producer's management apparatus 101 which is a sender of the producer information to the database integration management apparatus 100.

FIG. 13 shows examples of the producer's database 308 according to the present embodiment. The examples shown in FIG. 13 are the producer's databases 308 of Farms A and B, which are the producer of apples. Each of the databases contains the material IDs, average ambient temperature, shipment date, freshness date, forwarding agent ID, and destination ID of apples produced by each producer.

Figure 14:
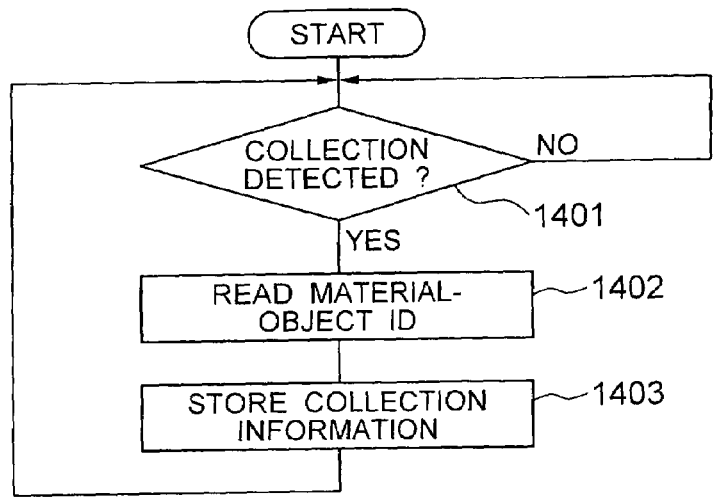
FIG. 14 is a flowchart showing the procedure of a collection information storing process according to the embodiment.

FIG. 14 shows a flowchart showing the procedure of a collection information storing process according to the present embodiment. As shown in FIG. 14, a collection information storing module 411 of a forwarding agent's management apparatus 102 performs the process for storing collection information about apples in the forwarding agent's database 408 when apples produced by producers are collected at a distribution center.

The collection information storing module 411 of the forwarding agent's management apparatus 102 determines whether a sensor installed at a shipment gate detects a box containing apples at step 1401. If it is determined that the box containing apples is detected, the process proceeds to step 1402.

At step 1402, a radio wave is sent to tags attached to the apples contained in the box to drive electronic circuit chips on the tags and material-object identification codes sent from the electronic circuit chips is read. The read material-object identification codes and collection information indicating the date of the material-object identification code reading are stored in the forwarding agent's database 308 at step 1403.

Figure 15:
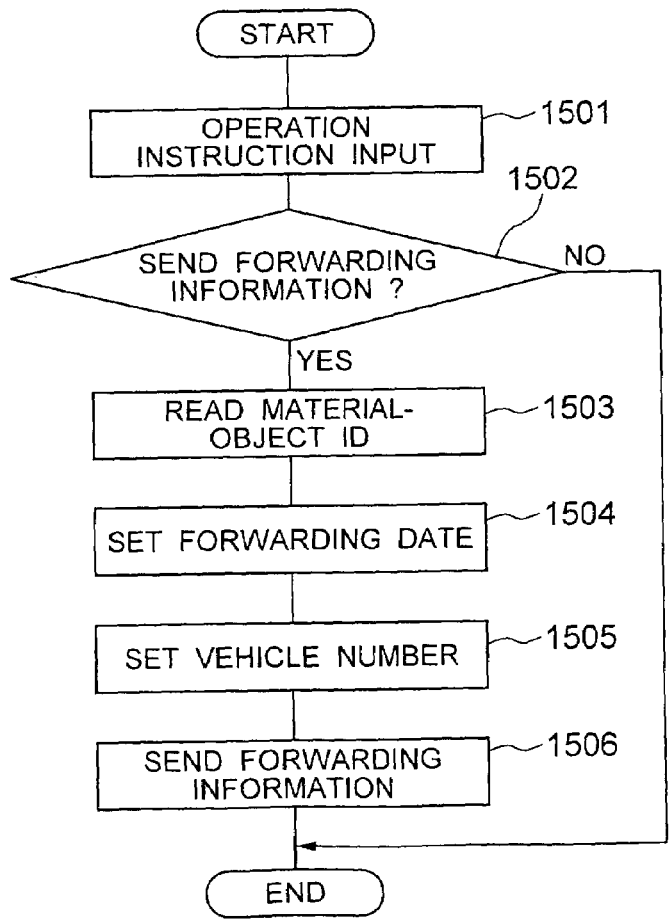
FIG. 15 is a flowchart showing the procedure of a forwarding information sending process according to the embodiment.

FIG. 15 shows a flowchart showing the procedure of a forwarding information sending process according to the present embodiment. As shown in FIG. 15, a forwarding information sending module 421 of an on-vehicle terminal 420 performs the process for reading material-object identification codes of apples on a transportation vehicle and sending forwarding information indicating the apples transported by the transportation vehicle to the forwarding agent's management apparatus 102 when the apples are classified by destination and loaded onto the transportation vehicle at the distribution center.

At step 1501, the forwarding information sending module 421 of the on-vehicle terminal 420 accepts an operation instruction input by a user operating the on-vehicle terminal 420. It is determined whether the accepted operation instruction is for sending forwarding information at step 1502. If it is determined that the instruction is for sending forwarding information, the process proceeds to step 1503.

At step 1503, a radio wave is sent to tags attached to the apples loaded on transportation vehicle to drive electronic circuit chips on the tags and material-object identification codes sent from the electronic circuit chips is read. The read material-object identification codes and the date of the material-object identification code reading are set as shipment information at step 1504 and a vehicle number identifying the transportation vehicle is read and set as the vehicle number of the transportation vehicle forwarding the apples identified by the read material-object information at step 1505. The read material-object identification codes and the set forwarding information and vehicle number are sent to the forwarding agent's management apparatus 102.

Figure 16:
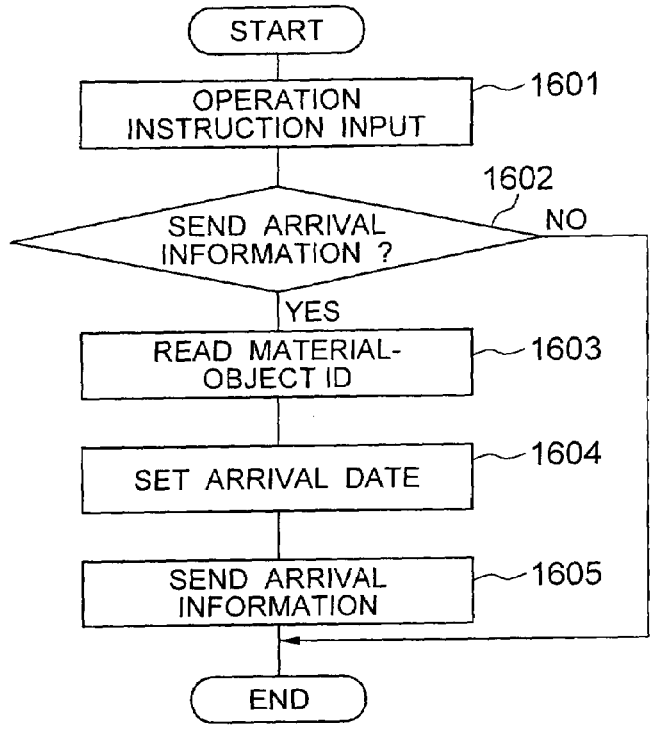
FIG. 16 is a flowchart showing the procedure of a selling information sending process according to the embodiment.

FIG. 16 shows a flowchart of the procedure of a selling information sending process according to the present embodiment. As shown in FIG. 16, a selling information sending module 422 of an on-vehicle terminal 420 performs the process for sending receipt information indicating that apples loaded on a transportation vehicle are received at their destination to the forwarding agent's management apparatus 102 when the transportation vehicle transporting the apples arrives at the destination.

At step 1601, the selling information sending module 422 of the on-vehicle terminal 420 accepts an operation instruction input by a user operating the on-vehicle terminal 420. At step 1602, it is determined whether the operation instruction is for sending selling information. If the operation instruction is for sending selling information, the process proceeds to step 1603.

At step 1603, a radio wave is sent to tags attached to apples arrived at the destination to drive electronic circuit chips on the tags and material-object identification code sent from the electronic circuit chips is read. The read material-object identification codes and the date of the material-object identification code reading are set as the selling information at step 1604. The read material-object identification code and the set selling information are sent to the forwarding agent's management apparatus 102 at step 1605.

Figure 17:
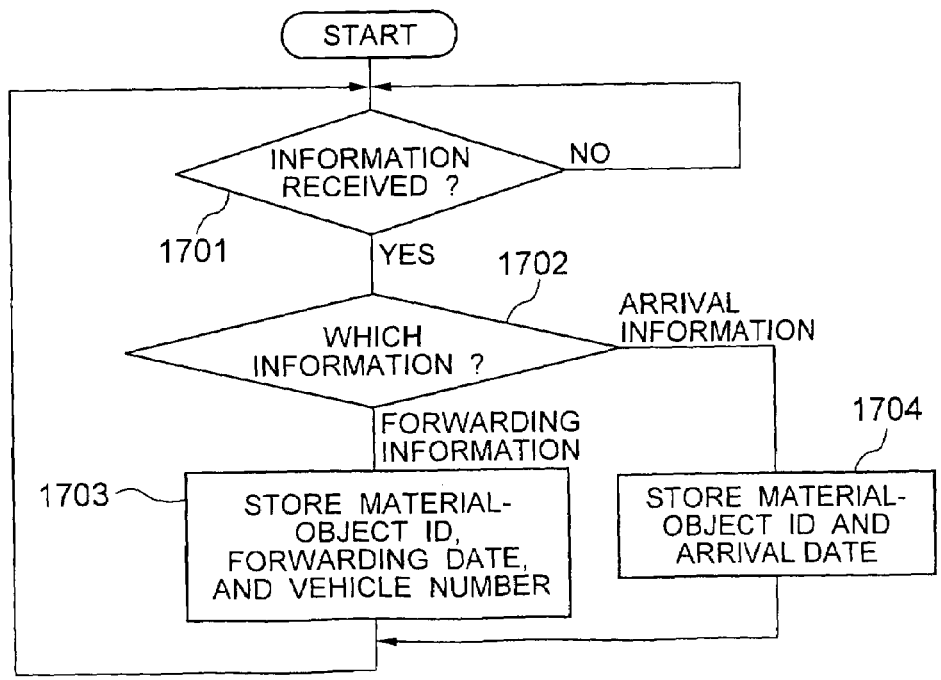
FIG. 17 is a flowchart showing the procedure of a forwarding information/selling information storing process according to the embodiment.

FIG. 17 shows a flowchart of the procedure of a forwarding information/selling information storing process according to the present embodiment. As shown in FIG. 17, when forwarding information or selling information is sent from a transportation vehicle, a forwarding information/selling information storing module 412 of the forwarding agent's management apparatus 102 performs the process for receiving the forwarding information or selling information sent from a on-vehicle terminal 402 of the transportation vehicle and storing it in forwarding agent's database 408.

At step 1701, the forwarding information/selling information storing module 412 of the forwarding agent's management apparatus 102 determines whether forwarding information or selling information is received from an on-vehicle terminal 420 of a transportation vehicle. If it is determined that forwarding information or selling information is received, the process proceeds to step 1702.

At step 1702, it is determined which of the information received from the on-vehicle terminal 420 of the transportation vehicle is forwarding information and selling information. If it is forwarding information, the process proceeds to step 1703. If it is selling information, the process proceeds to step 1704. At step 1703, material-object identification codes, forwarding information, and a vehicle number received from the on-vehicle terminal 420 are stored in forwarding agent's database 408. At step 1704, material-object identification codes and selling information received from the on-vehicle terminal 420 are stored in the forwarding agent's database 408.

When forwarded apples arrive at their destination and their material-object identification codes are associated with selling information and stored in the forwarding agent's database 408, the forwarding agent' management apparatus 102 of the present embodiment sends the material-object identification codes, collection information, forwarding information, and selling information to the database integration management apparatus 100.

Figure 18:
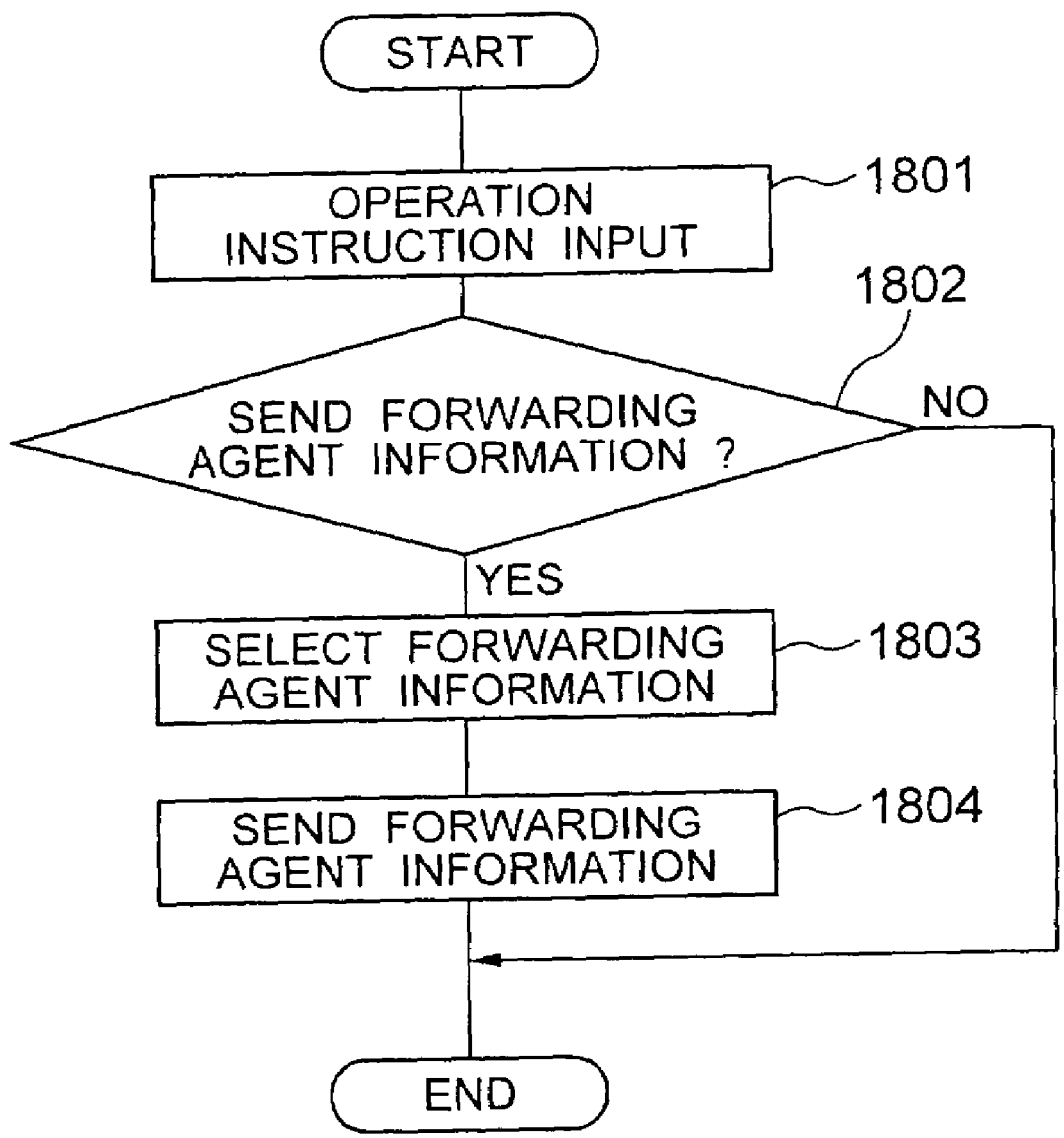
FIG. 18 is a flowchart showing the procedure of a forwarding agent information sending process according to the embodiment.

FIG. 18 shows a flowchart of the procedure of a forwarding agent information sending process according to the present embodiment. As shown in FIG. 18, a forwarding agent information sending module 413 of the forwarding agent's management apparatus 102 performs the process for sending material-object identification codes, collection information, forwarding information, and selling information stored in the forwarding agent's database 408 to the database integration management apparatus 100 as forwarding agent information.

At step 1801, the forwarding agent information sending module 413 of the forwarding agent's management apparatus 102 accepts an operation instruction input by a user operating the forwarding agent's management apparatus 102. At step 1802, it is determined whether the operation instruction is for sending forwarding agent information. If it is an instruction for sending forwarding agent information, the process proceeds to step 1803.

At step 1803, forwarding agent information to be sent to the database integration management apparatus 100 is selected from material-object information stored in the forwarding agent's database 408. Previously sent data and confidential data such as those representing transportation costs are left out of this selection. It is assumed here that which information is confidential is separately defined in the forwarding agent's database 408.

At step 1804, the selected material-object identification codes, collection information, forwarding information, and selling information is sent to the database integration management apparatus 100 as forwarding agent information together with a sender identification code indicating the forwarding agent's management apparatus 102, which is the sender of the forwarding agent information.

FIG. 19 shows an example of the forwarding agent's database 408 of the present embodiment. The examples shown in FIG. 19 are databases 408 of Forwarding agents A and B. Each of the databases contains material-object identification codes, collection date, forwarding date, vehicle number, destination identification code, and selling date of apples forwarded by each forwarding agent.

Figure 20:
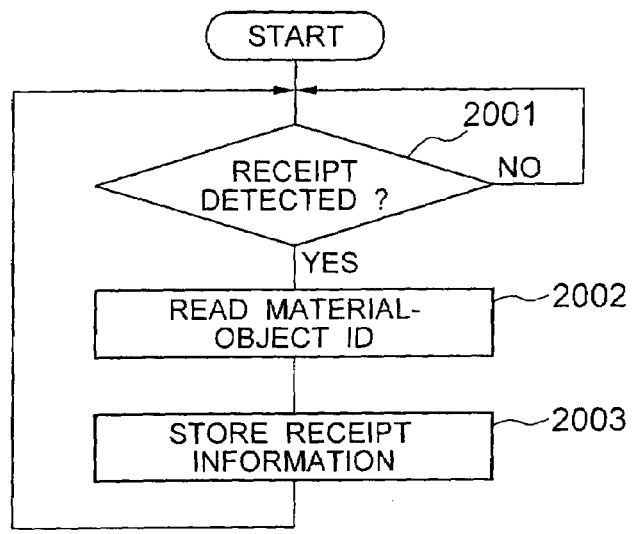
FIG. 20 is a flowchart showing the procedure of a receipt information storing process according to the embodiment.

FIG. 20 shows a flowchart of the procedure of a receipt information storing process according to the present embodiment. As shown in FIG. 20, when apples forwarded by a forwarding agent arrive at a selling agent, a receipt information storing module 511 of selling agent's management apparatus 103 performs the process for reading the material-object identification codes of the arrived apples and storing receipt information indicating the date and time of the receipt of the apples at selling agent's database 508.

At step 2001, a receipt information storing module 511 of the selling agent's management apparatus 103 determines whether a sensor installed at a receipt gate detects a box containing apples. If it is determined that a box containing apples is detected, the process proceeds to step 2002.

At step 2002, a radio wave is sent to tags attached to the apples contained in the box to drive electronic circuit chips on the tags and material-object identification codes sent from the electronic circuit chips is read. At step 2003, the read material-object identification codes and receipt information indicating the date of reading the material-object identification codes are stored in the selling agent's database 508.

Figure 21:
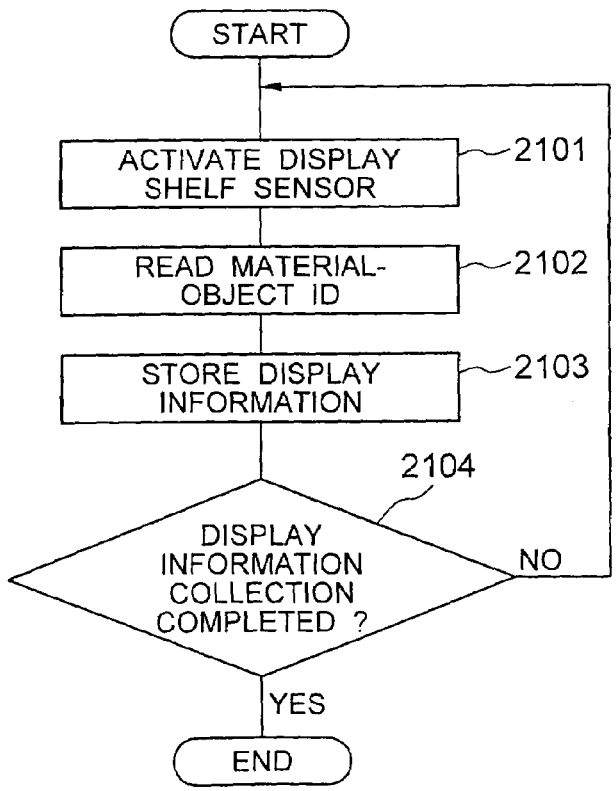
FIG. 21 is a flowchart showing the procedure of a display information storing process according to the embodiment.

FIG. 21 shows a flowchart of the procedure of a display information storing process according to the present embodiment. As shown in FIG. 21, when arrived apples are displayed on a display shelf at the selling agent's store, a display information storing module 512 of the selling agent's management apparatus 103 performs the process for reading the material-object identification codes of the displayed apples and storing display information indicating the display position of the apples in selling agent's database 508.

A display information storing module 512 of the selling agent's management apparatus 103 activates a sensor installed on the display shelf on which the apples are displayed at step 2101, sends a radio wave to tags attached to the apples displayed on the display shelf to drive electronic circuit chip on the tags and reads material-object identification codes sent from the electronic circuit chips at step 2102. At step 2103, the read material-object identification codes and display information indicating a shelf number identifying the display shelf from which the material-object identification codes are read are stored in selling agent's database 508.

At step 2104, it is determined whether the collection of the display information about the apples displayed on all the display shelves is completed. If the collection of all display information is not completed, the process returns to step 2101 and the above-describe process is repeated.

Figure 22:
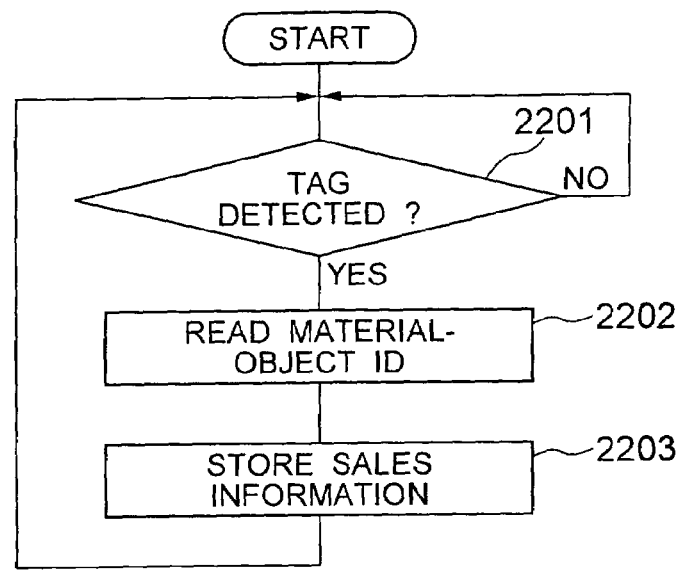
FIG. 22 is a flowchart showing the procedure of a sales information obtaining process according to the embodiment.

FIG. 22 shows a flowchart of the procedure of a sales information obtaining process according to the present embodiment. As shown in FIG. 22, when an apple displayed on a display shelf is carried by a consumer to a cash register, a sales information sending module 521 of a POS terminal 520 performs the process for reading the material-object identification code of the apple and sending sales information indicating the date and time of the sales of the apple to the selling agent's management apparatus 103.

At step 2201, the sales information sending module 521 of the POS terminal 520 determines whether a sensor installed in the POS terminal 520 is detecting an apple to be sold to a consumer. If it is determined that an apple to be sold is detected, the process proceeds to step 2202.

At step 2202, a radio wave is sent to a tag attached to the apple to be sold to drive an electronic circuit chip on the tag and a material-object identification code sent from the electronic circuit chip is read. The read material-object identification code and sales information indicating the date of reading the material-object identification code are sent to selling agent's database 508 at step 2203. A price associated with the read material-object identification code may be received from the selling agent database 508 and the read material-object identification code may be used to calculate an amount charged at the cash register.

Figure 23:
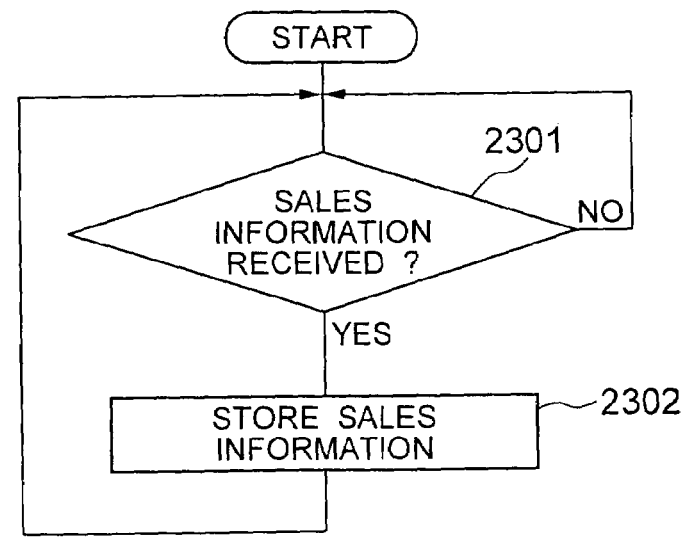
FIG. 23 is a flowchart showing the procedure of a sales information storing process according to the embodiment.

FIG. 23 shows a flowchart of the procedure of a sales information storing process according to the present embodiment. As shown in FIG. 23, a sales information storing module 513 of the selling agent's management apparatus 103 performs the process for receiving sales information sent from the POS terminal 520 and storing it in the selling agent's database 508.

At step 2301, the sales information storing module 513 of the selling agent's management apparatus 103 determines whether sales information is received from the POS terminal 520. If sales information is received, the process proceeds to step 2302. At step 2302, the material-object identification code and sales information received from the POS terminal 502 are stored in the selling agent's database 508.

When an arrived apple is sold to a consumer and its material-object identification code is associated with sales information and stored in the selling agent's database 508, the selling agent's management apparatus 103 according to the present embodiment sends the material-object identification code, receipt information, display information, and sales information to the database integration management apparatus 100.

Figure 24:
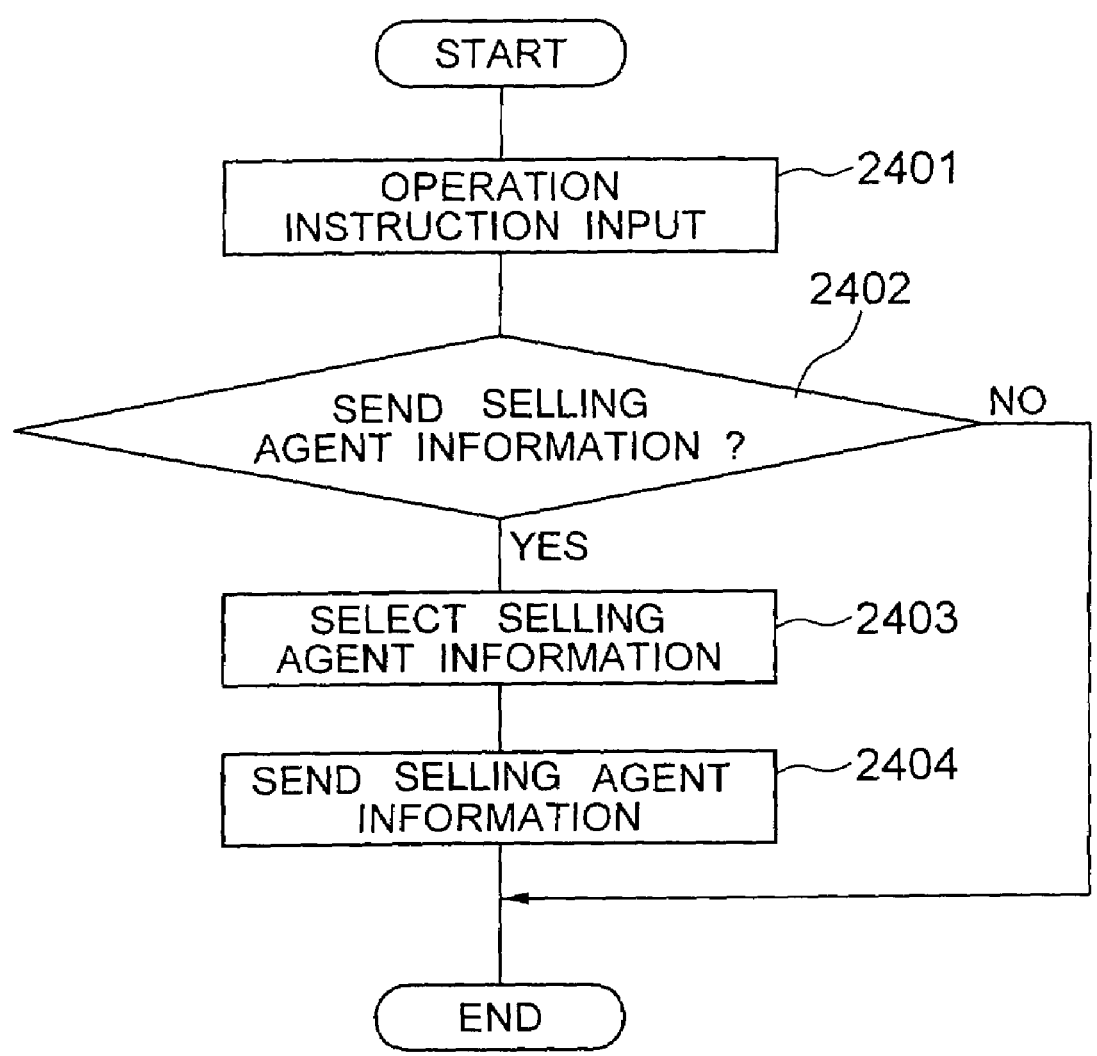
FIG. 24 is a flowchart showing the procedure of a selling agent information sending process according to the embodiment.

FIG. 24 shows a flowchart of the procedure of a selling agent information sending process according to the present embodiment. As shown in FIG. 24, a selling agent information sending module 514 of the selling agent's management apparatus 103 sends a material-object identification code, receipt information, display information, and sales information stored in the selling agent's database 508 to the database integration management apparatus 100 as selling agent information.

At step 2401, the selling agent information sending module 514 of the selling agent's management apparatus 103 accepts an operation instruction input by a user operating the selling agent's management apparatus 103. It is determined whether the accepted instruction is for sending selling agent information at step 2402. If it is an instruction for sending selling agent information, the process proceeds to step 2403.

At step 2403, selling agent information to be sent to the database integration management apparatus 100 is selected from material-object information stored in the selling agent's database 508. Previously sent data and confidential data such as those representing purchasing costs are left out of this selection. It is assumed here that which information is confidential is separately defined in the selling agent's database 508.

At step 2404, the selected material-object identification code, receipt information, display information and sales information are sent to the database integration management apparatus 100 as the selling agent information together with a sender identification code indicating the selling agent's management apparatus, which is the sender of the deliver agent information.

FIG. 25 shows examples of the selling agent's database 508 of the present embodiment. The examples shown in FIG. 25 are databases 508 of selling agents, which are Supermarkets A and B. Each database contains material-object identification codes, receipt dates, display positions, sales prices, and sales dates of apples sold by each selling agent.

Figure 26:
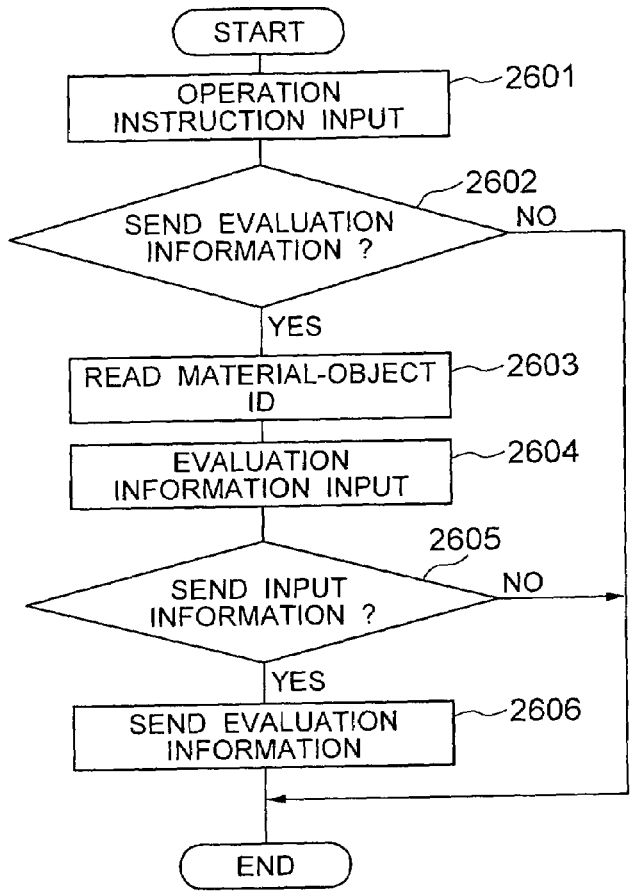
FIG. 26 is a flowchart showing the procedure of an evaluation information sending process according to the embodiment.

FIG. 26 shows a flowchart of the procedure of an evaluation information sending process according to the present embodiment. As shown in FIG. 26, when evaluation information about an apple purchased by a consumer is input, an evaluation information sending module 623 of a consumer's mobile phone 105 performs the process for reading the material-object identification code of the apple, accepting evaluation and comments input by the consumer about the apple, and sending them from the consumers mobile phone 105 to questionnaire survey agent's management apparatus 104.

At step 2601, the evaluation information sending module 623 of the consumer's mobile phone 105 accepts an operation instruction input by a user operating the consumer's mobile phone 105. It is determined whether the operation instruction is for sending evaluation information at step 2602. If it is an instruction for sending evaluation information, the process proceeds to step 2603.

At step 2603, a radio wave is sent to tag attached to an apple to be evaluated by the user to drive an electronic circuit chip on the tag and a material-object identification code sent from the electronic circuit chip is read. At step 2604, the apple's rating, such as "A", "B", or "C", and a comment about the rating input by a consumer is accepted and set as evaluation information.

At step 2605, it is determined whether an instruction to send the accepted evaluation information is input or not. If the send instruction is input, the process proceeds to step 2606. At step 2606, the read material-object identification code and the set evaluation information are sent to the questionnaire survey agent's management apparatus 104.

Figure 27:
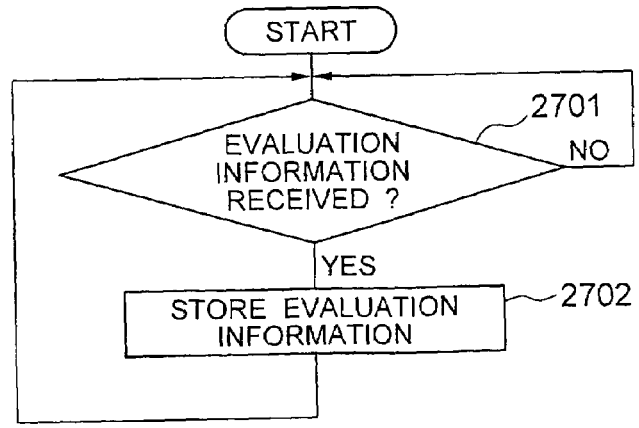
FIG. 27 is a flowchart showing the procedure of an evaluation information storing process according to the embodiment.

FIG. 27 shows a flowchart of the procedure of an evaluation information storing process according to the present embodiment. As shown in FIG. 27, an evaluation information storing module 611 of the questionnaire survey agent's management apparatus 104 performs the process for receiving evaluation information and a comment sent from a consumer's mobile phone 105 and storing them in questionnaire survey agent's database 608.

At step 2701, the evaluation information storing module 611 of the questionnaire survey agent's management apparatus 104 determines whether evaluation information is received from a consumer's mobile phone 105. If evaluation information is received, the process proceeds to step 2702. At step 2702, a material-object identification code and the evaluation information is received from the consumer's mobile phone 105 are stored in the questionnaire survey agent's database 608.

After the questionnaire survey agent's management apparatus 104 of the present embodiment accepts the evaluation of a sold apple from the consumer, associates the material-object identification code with the evaluation information, and stores them in the questionnaire survey agent's database 608, the questionnaire survey agent's management apparatus 104 sends the material-object identification code, evaluation information, and comment to the database integration management apparatus 100.

Figure 28:
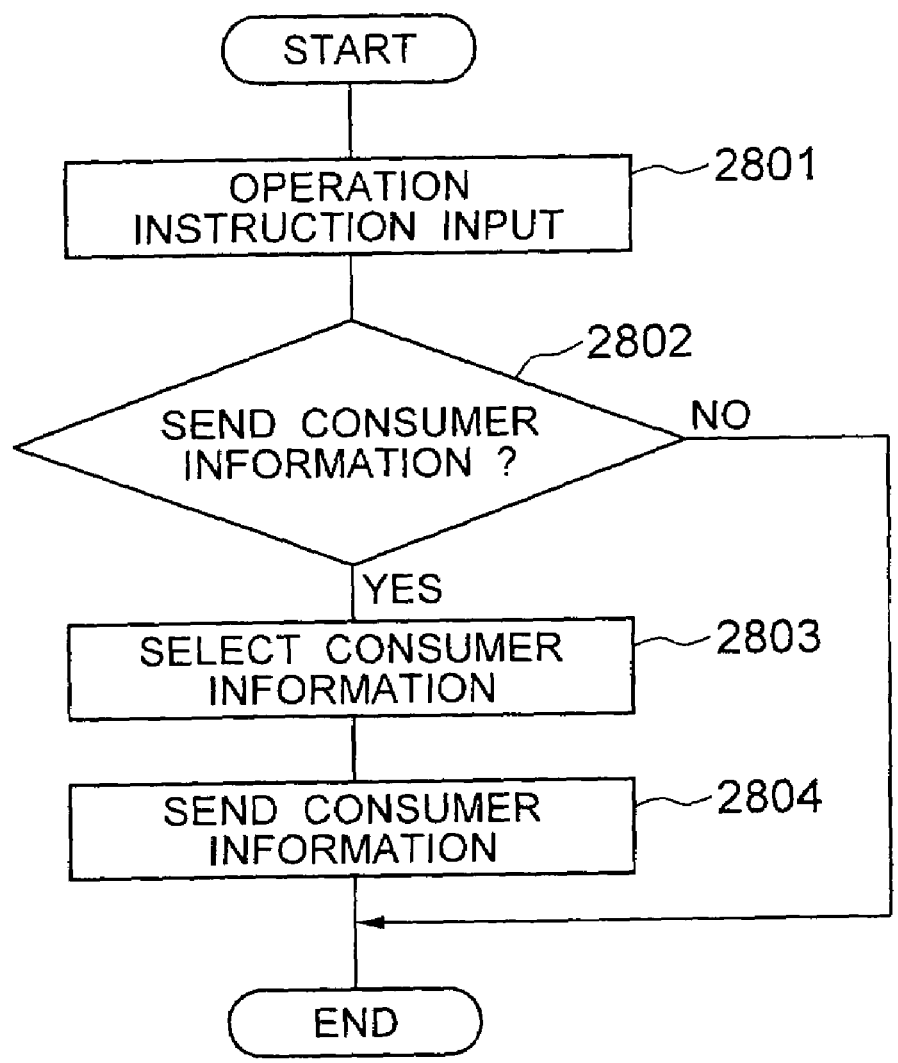
FIG. 28 is a flowchart showing the procedure of a consumer information sending process according to the embodiment.

FIG. 28 shows a flowchart of the procedure of a consumer information sending process according to the present embodiment. As shown in FIG. 28, a consumer information sending module 612 of the questionnaire survey agent's management apparatus 104 performs the process for sending material-object identification codes, evaluation information stored in the questionnaire survey agent's database 608, and comments to the database integration management apparatus 100 as consumer information.

At step 2801, the consumer information sending module 612 of the questionnaire survey agent's management apparatus 104 accepts an operation instruction input by a user operating the questionnaire survey agent's management apparatus 104. It is determined whether the operation instruction is for sending consumer information or not at step 2802. If it is an instruction for sending consumer information, the process proceeds to step 2803.

At step 2803, consumer information to be sent to the database integration management apparatus 100 is selected from material-object information stored in the questionnaire survey agent's database 608. Previously sent data and confidential data such as those representing personal information about respondents to a questionnaire are left out of this selection. It is assumed here that which information is confidential is separately defined in the questionnaire survey agent's database 608.

At step 2804, the selected material-object identification code, evaluation information, and comments are sent the database integration management apparatus 100 as consumer information together with a sender identification code identifying the questionnaire survey agent's management apparatus 104, which is the sender of the consumer information.

FIG. 29 shows an example of the questionnaire survey agent's database 608 according to the present embodiment. The example shown in FIG. 29 is a questionnaire survey agent database 608 of Consumer Information Center A, a questionnaire survey agent, which contains material-object identification codes of apples, their ratings, and comments collected by the questionnaire survey agent.

Figure 30:
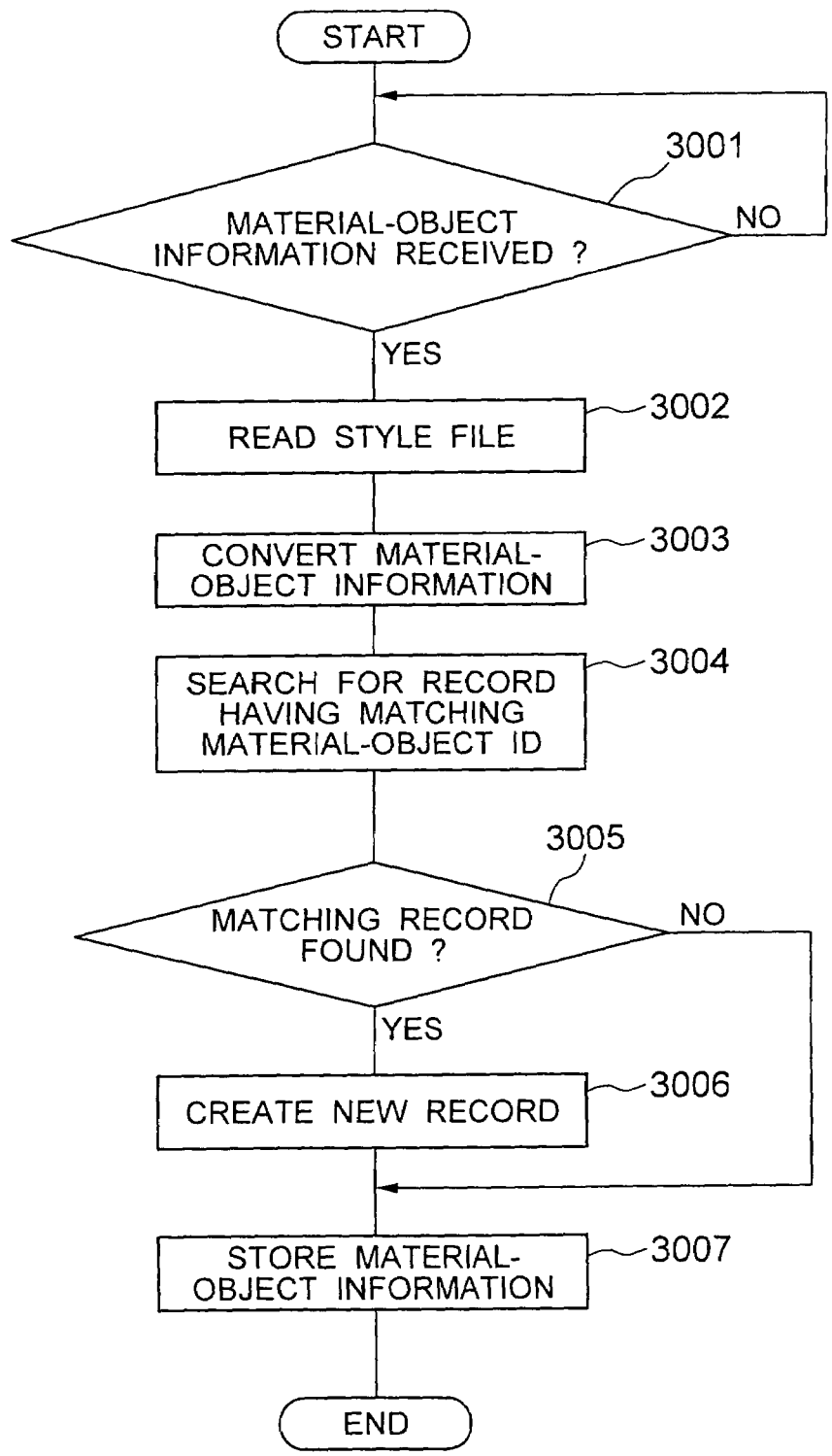
FIG. 30 is a flowchart showing the procedure of an integrated material-object storing process according to the embodiment.

FIG. 30 shows a flowchart of the procedure of an integrated material-object storing process according to the present embodiment. As shown in FIG. 30, integrated material-object information storing module 211 of the database integration management apparatus 100 performs the process for integrating material-object information associated with the same material-object identification code among producer information received from a producer's management apparatus 101, forwarding agent information received from a forwarding agent's management apparatus 102, selling agent information received from a selling agent's management apparatus 103 and consumer information received from a questionnaire survey agent's management apparatus 104 to generate integrated material-object information and associating the material-object identification code and the integrated material-object information identified by the identification code to store them in an integrated database 208.

At step 3001, the integrated material-object information storing module 211 of the database integration management apparatus 100 determines whether the database integration management apparatus 100 has received material-object information from the producer's management apparatus 101, forwarding agent's management apparatus 102, selling agent's management apparatus 103, or the questionnaire survey agent's management apparatus 104. If it is determined that it has received material-object information, the process proceeds to step 3002.

At step 3002, the integrated material-object information storing module 211 references a sender identification code identifying the sender of the material-object information to determine which of the producer's management apparatus 101, forwarding agent's management apparatus 102, selling agent's management apparatus 103, and questionnaire survey agent's management apparatus 104 is the sender of the material-object information, and reads a style file for converting the format of the sender's material-object information into a format for the integrated database 208. At step 3003, it converts the received material-object information into the format for the integrated database 208 by using the style file corresponding to the sender identification code.

At step 3004, a material-object identification code contained the converted material-object information is used as a search key to search through the integrated database 208. It is determined whether a record having a material-object identification code that matches the material-object identification code in the material-object information is searched in the integrated database 208. If no record having the material-object identification code in the material-object information is found, the process proceeds to step 3006, where a new record is created in the integrate database 208 and the value of the material-object identification code in the material-object information is stored in its material-object identification code entry. At step 3007, entry values in the converted material-object information are stored in corresponding entries in a record found in the above-mentioned searched or the newly created record.

FIG. 31 shows an example of the integrated database 208 according to the present embodiment. The example shown in FIG. 31 is an integrated database 208 integrated as described above. It contains the material-object identification codes of apples, producer identification codes, average ambient temperatures, shipping dates, freshness dates, forwarding agent identification codes, collection dates, forwarding dates, vehicle numbers, selling dates, selling agent identification codes, receipt dates, display positions, sales prices, sales dates, questionnaire survey agent identification codes, ratings, and comments. Some of the items, prices for example, could be omitted.

While the material-object identification code and material-object information are sent to the database integration management apparatus 100 when the identification code is associated with material-object information and stored in the material-object information database in the process described above, the material-object identification code and material-object information associated with it may be sent from the producer's management apparatus 101, forwarding agent's management apparatus 102, selling agent's management apparatus 103, and questionnaire survey agent's management apparatus 104 to the database integration management apparatus 100 when an evaluation information about a material-object is input to the questionnaire survey agent's management apparatus 104.

That is, when evaluation information about a material-object is input into the questionnaire survey agent's management apparatus 104, the questionnaire agent's management apparatus 104 notifies the database integration management apparatus 100 of the completion of the storage of the material-object information in all the categories from the producer to consumer information in their respective databases. The database integration management apparatus 100 receives the notification, requests the producer's management apparatus 101, forwarding agent's management apparatus 102, selling agent's management apparatus 103, and questionnaire survey agent's management apparatus 104 in sequence to send material-object information, and stores the received information in the integrated database 208. Storing in this way the material-object information in the integrated database 208 after the material-object information in all the categories from the producer to consumer is stored in their respective databases can avoid the waste of storage area and communication process because integrated material-object information without any final consumer information is not stored.

When sending integrated material-object information associated with a given material-object identification code is requested, the material-object identification code and the material-object information associated with it are may be sent from the producer's management apparatus 101, forwarding agent's management apparatus 102, selling agent's management apparatus 103, and questionnaire survey agent's management apparatus 104 to the database integration management apparatus 100 and the integrated material-object information obtained may be sent to the requester.

That is, when the database integration management apparatus 100 is requested to send integrated material-object information about a material-object, the database integration management apparatus 100 requests the transmission of the material-object information from any of the producer's management apparatus 101, forwarding agent's management apparatus 102, selling agent's management apparatus 103, and questionnaire survey agent's management apparatus 104 storing the requested material-object information. The database integration management apparatus 100 receives the material-object information, then sends it to its requester. Sending the integrated material-object information on demand in this way can reduce the management load on the database integration management apparatus 100 because the integrated database 208 does not need a large storage area.

When integrated material-object information is generated as described above, the producer's management apparatus 101, forwarding agent's management apparatus 102, and selling agent's management apparatus 103 of the present embodiment receive the integrated material-object information about a material object handled in each business category from the database integration management apparatus 100 and present it to a person in charge in each category for performing a process to help improve CRM services. The use of the integrated material-object information in the producer's management apparatus 101 will be described below.

Figure 32:
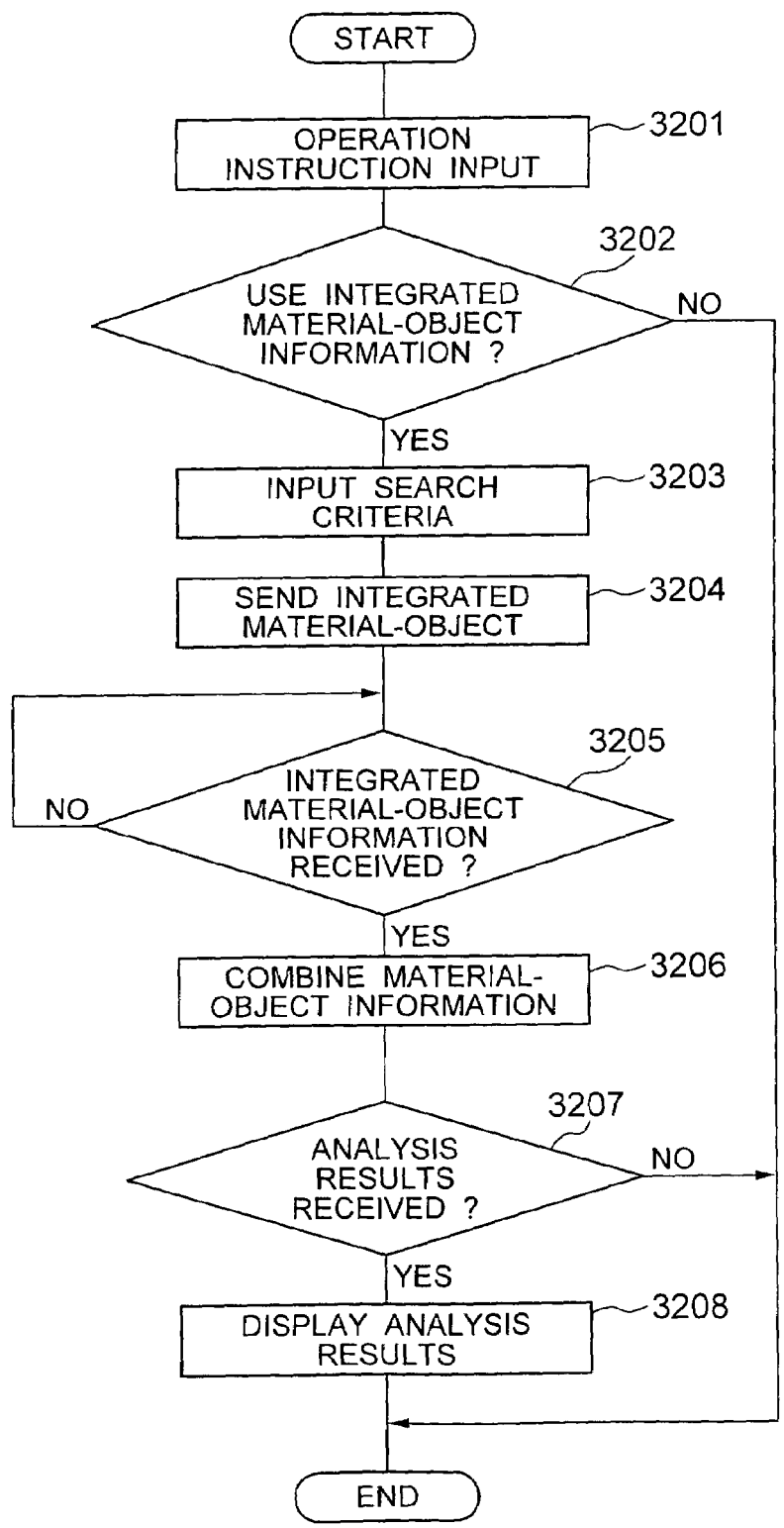
FIG. 32 is a flowchart showing the procedure of a producer integrated material-object information using process according to the embodiment.

FIG. 32 shows a flowchart of the procedure of an integrated material-object information using process performed by a producer. As shown in FIG. 32, an integrated material-object information requesting module 314 of the producer's management apparatus 101 requests the database integration management apparatus 100 to send integrated material-object information associated with a material-object identification code stored in the producer's database 308 in terms of apples produced by the producer. An integrated material-object information output module 315 performs a process for receiving the requested integrated material-object information from the database integration management apparatus 100 and outputting it.

At step 3201, the integrated material-object information requesting module 314 of the producer's management apparatus 101 accepts an operation instruction input by a user operating the producer's management apparatus 101. It is determined whether the operation instruction is an instruction for using integrated material-object information at step 3202. If it is an instruction for using integrated material-object information, the process proceeds to step 3203.

At step 3203, search criteria input by the user for searching an integrated database 208 is accepted. The criteria for a search by the producer may be criteria for searching apples produced by the producer and sold or not sold in the past one month, or sold and rated low or high by consumers.

At step 3204, the accepted search criteria is sent from the producer's management apparatus 101 to the database integration management apparatus 100 together with a sender identification code indicating the producer's management apparatus 101, which is the sender of the material-object information request to request the use of integrated material-object information.

It is determined whether the results of the search for the integrated material-object information are received from the database integration management apparatus 100 at step 3205. If the results of the material-object information search are received, the process proceeds to step 3206.

At step 3206, a record having a material-object identification code that matches the material-object identification code in the received integrated material-object information is read from the producer's database 308, combined with the received integrated material-object information, and output to an output device 305. The producer can compare the record in the producer's database 308 with the integrated material-object information displayed on the output device 305 to know under what conditions, such as an ambient temperature, apples sold or not sold in the past one month, or sold and rated low or high by consumers are produced, for reference for the subsequent production.

At step 3207, it is determined whether, together with the results of the search for integrated material-object information, results of the analysis of material-object information highly correlating with information about the evaluation or sales of the material objects are received or not at step 3205. If the results of the analysis are received, the process proceeds to step 3208, where the results are output to the output device 305. The producer can identify the reason why apples are sold or not sold in the past month, or sold and rated low or high by consumers is the producer's factor such as an ambient temperature, or factors in other categories such as the forwarding agent or selling agent, thereby helping the producer in choosing a forwarding agent to give a contract to the next transportation or a selling agent to which material objects are supplied.

Figure 33:
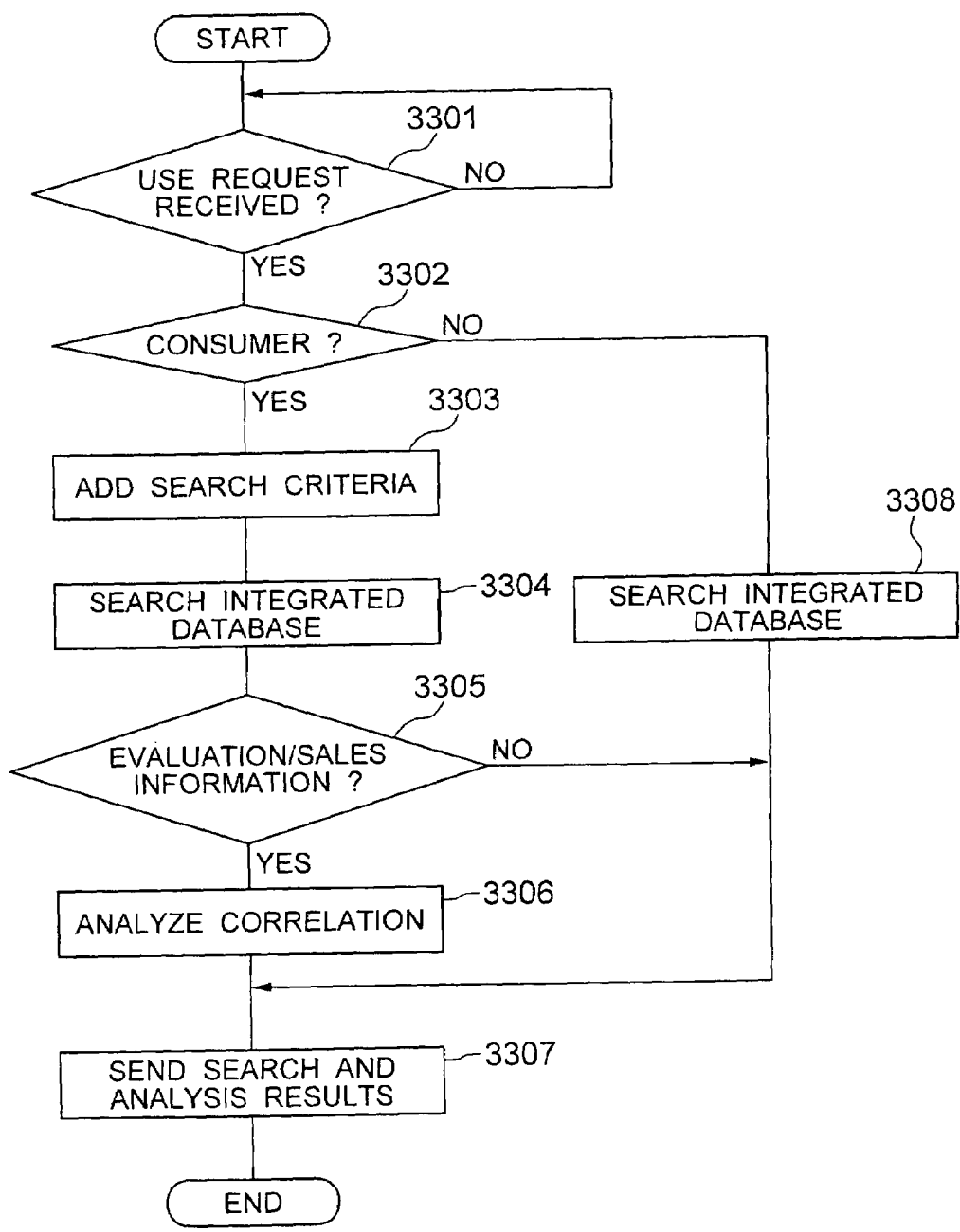
FIG. 33 is a flowchart showing the procedure of an integrated material-object information sending process according to the embodiment.

FIG. 33 shows a flowchart of the procedure of an integrated material-object information sending process according to the present embodiment. As shown in FIG. 33, an integrated material-object information sending module 212 of the database integration management apparatus 100 performs a process for receiving a request for the transportation of integrated material-object information from a producer's management apparatus 101, forwarding agent's management apparatus 102, or selling agent's management apparatus 103, reading the requested integrated material-object information from an integrated database 208, and sending it from the database integration management apparatus 100 to the requester. If the integrated material-object information includes information about the evaluation or sales of apples, an integrated material-object information analysis module 213 analyzes material-object information highly correlating with the evaluation or sales information and sends the results to the requester.

At step 3301, the integrated material-object information sending module 212 of the database integration management apparatus 100 determines whether a request for using integrated material-object information is received from a producer's management apparatus 101, forwarding agent's management apparatus 102, selling agent's management apparatus 103, or a consumers mobile phone 105. If such a request is received, the process proceeds to step 3302.

At step 3302, the integrated material-object information sending module 212 references a sender identification code indicating the sender of the request for using the integrated material-object information to determine whether the sender is the consumer's mobile phone 105. If it is not the consumer's mobile phone 105, the process proceeds to step 3303.

At step 3303, the integrated material-object information sending module 212 references the sender identification code indicating the sender of the integrated material-object information to determine which of the producer's management apparatus 101, forwarding agent's management apparatus 102, and selling agent's management apparatus 103. It adds, to search criteria sent as the request for use, search criteria indicating that the sender identification code matches the producer's identification code if the sender of the request is the producer's management apparatus 101, search criteria indicating that the sender identification code matches the forwarding agent's identification code if the sender is the forwarding agent's management apparatus 102, or search criteria indicating that the sender identification code matches the selling agent's identification code if the sender is the selling agent's management apparatus 103 to generate new search criteria. Then it uses the generated search criteria to search the integrated database 208 at step 3304.

An integrated material-object information analysis module 213 references the results of the analysis to determine whether retrieved integrated material-object information contains evaluation information or sales information at step 3305. If it contains the evaluation or sales information, the process proceeds to step 3306.

At step 3306, correlation between the evaluation or sales information and each of producer information, forwarding agent information, and selling agent information. If there is material-object information highly correlating with the evaluation or sales information, analysis results indicating that material-object information are generated. At step 3307, the search results obtained at step 3304 and the analysis results obtained at step 3306 are sent to the requester of the use of the integrated material-object information.

The consumer's mobile phone 105 according to the present embodiment performs a process for receiving the integrated material-object information generated as described above from the database integration management apparatus 100 and presenting it to a consumer as reference information used by the user in purchasing a material object to support users. The use of the integrated material-object information through the mobile phone 105 will be described below.

Figure 34:
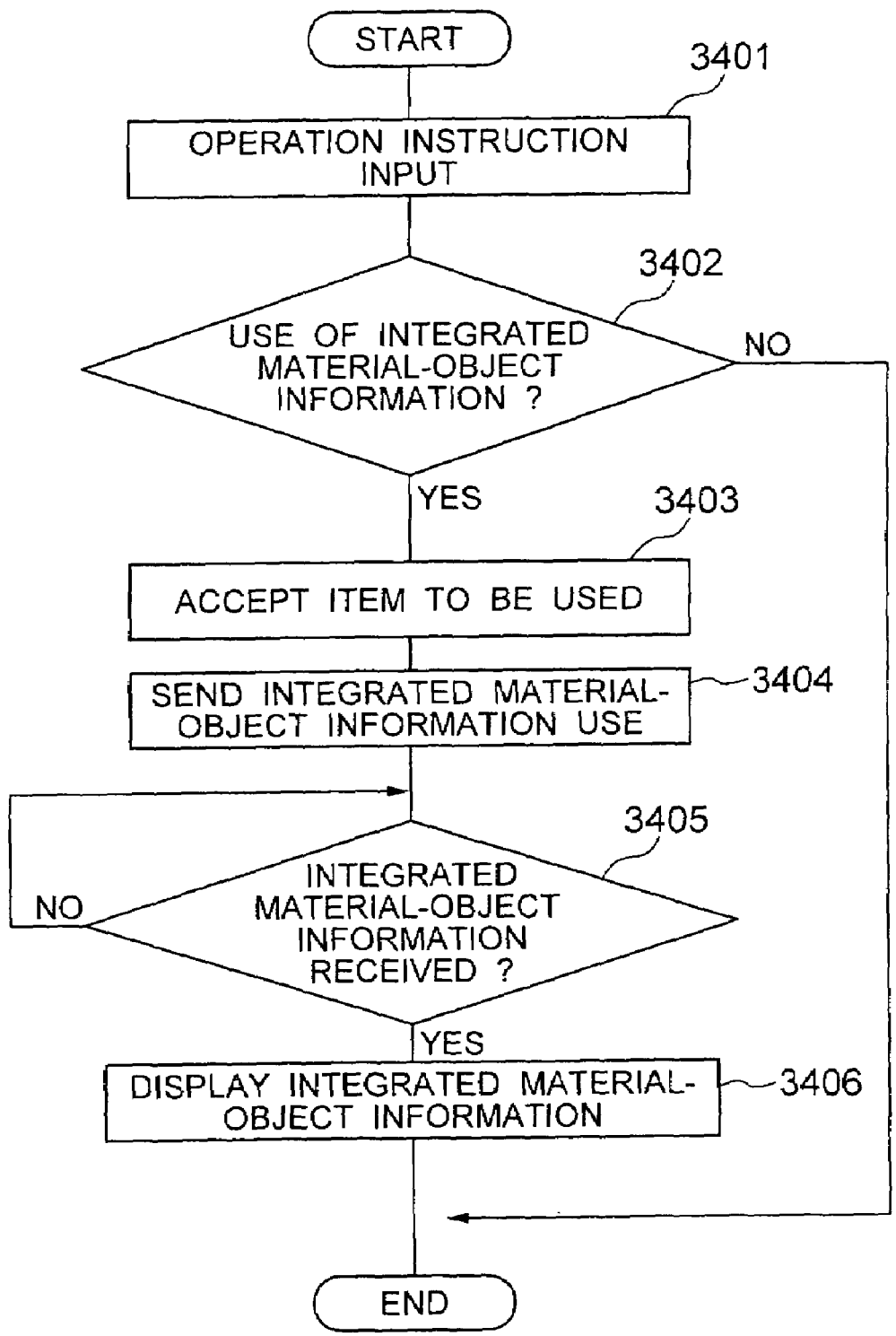
FIG. 34 is a flowchart showing the procedure of an integrated material-object information using process according to the embodiment.

FIG. 34 shows a flowchart of a procedure for a consumer to use integrated material-object information. When the consumer wants to buy an apple displayed on a display shelf, an integrated material-object information requesting module 621 of consumer's mobile phone 105 performs a process for reading the material-object identification code of the apple through a sensor contained within the consumer's mobile phone 105 and requesting from the consumer's mobile phone 105 the transmission of integrated material-object information identified by the material-object identification code from the database integration management apparatus 100 as shown in FIG. 34. An integrated material-object information outputting module 622 receives the integrated material-object information sent from the database integration management apparatus 100 and presents it on the display screen of the consumer's mobile phone 105.

At step 3401, the integrated material-object information requesting module 621 of the consumer's mobile phone 105 accepts an operation instruction input by the user operating the consumer's mobile phone 105. At step 3402, it determines whether the accepted instruction is for using integrated material-object information. If it is an instruction for using integrated material-object information, the process proceeds to step 3403.

At step 3403, a radio wave is sent to a tag attached to an apple to be bought by the consumer to drive an electronic circuit chip on the tag, a material-object identification code sent from the chip is read, and an entry of the material-object information selected by the consumer is accepted. Here, the entry selected by the consumer may be producer information indicating the freshness date of the apple, selling agent information indicating the quantity and price of apples of the same kind sold by other selling agents, and consumer information indicating the evaluation of apples of the same kind.

At step 3404, the accepted item of the integrated material-object information is sent to the database integration apparatus 100 from the consumer's mobile phone 105 together with the read material-object identification code to request the use of the material-object information.

At step 3301 in FIG. 33, an integrated material-object information sending module 212 of the database integration management apparatus 100 determines whether a request for using integrated material-object information is received from the consumer's mobile phone 105. If the request is received, the process proceeds to step 3302.

At step 3302, a sender identification code identifying the sender of the request is referenced to determine whether the sender of the request is the consumer's mobile phone 105 or not. If the sender is the consumer's mobile phone 105, the process proceeds to step 3308. Here, if no sender identification code is found, the sender may be assumed to be consumer's mobile phone 105.

At step 3308, integrated material-object information corresponding to the entry received from the consumer's mobile phone 105 is retrieved from an integrated database 208. Then the process proceeds to step 3307. At step 3307, the retrieved search results obtained at step 3308 are sent to the consumer's mobile phone 105, the requester of the integrated material-object information.

At step 3405 in FIG. 34, an integrated material-object information outputting module 622 of the consumer's mobile phone 105 determines whether the results of the search for the integrated material-object information requested are received from the database integration management apparatus 100. If the results of the search for the integrated material-object information are received, the process proceeds to step 3406.

At step 3406, the received integrated material-object information is displayed on the display screen of the consumer's mobile phone. The consumer can see producer information indicating the freshness date of the apple, selling agent information indicating the quantity and price of apples of the same kind sold by other selling agents, and consumer information indicating the evaluation of apples of the same kind for reference in buying the apple.

While apples are used as an example in the description of this embodiment, the present invention may be also applied to other material objects, if the condition that a tag can be attached to the each individual object are met. Furthermore, a recording medium on which a program for causing apparatuses to function as the above-described processing modules may be accessed through a network, and the program may be loaded into memory through the network, and executed.

According to the database integration management system of the present embodiment described above, a plurality of items of material-object information is integrated and managed by using the material-object identification code of each individual material object and integrated material-object information is provided to users in different business categories, thus allowing the material-object information to be used in a plurality of business categories.

What is claimed is:

1. A database integration management system comprising:
    an integrated database; and
    an integrated material-object information storing module integrating items of material-object information having same material-object identification code with each other among material-object identification codes and items of material-object information received from a plurality of material-object information modules in each business category to generate integrated material-object information, associating the material-object identification code with the integrated material-object information, and storing the material-object identification code and the integrated material-object information in the integrated database.

2. The database integration management system according to claim 1, wherein said integrated material-object information storing module converts the received material-object information into a format for the integrated database, and stores entry values of the converted material-object information in a record having a material-object identification code the same as the material-object identification code of the received material-object information in the integrated database.

3. The database integration management system according to claim 2, wherein the integrated material-object information storing module references a sender identification code included in the material-object information to determine a sender among said plurality of material-object information modules, and uses a style of a file corresponding to the sender identification code to convert the received material-object information into the format for the integrated database.

4. The database integration management system according to claim 2, wherein the integrated material-object information storing modules searches the integrated database by using a material-object identification code as a search key, and creates, when no record having the material-object identification code in the material-object information is found, a record corresponding to the material-object identification code.

5. The database integration management system according to claim 1, further comprising:
an integrated material-object information sending module for receiving a request to send the material-object identification code and the integrated material-object information identified by the material-object identification code, reading said requested integrated material-object information from the integration database and sending said integrated material-object information to a requester.

6. The database integration management system according to claim 1, wherein the material-object identification code is recorded on an electronic circuit chip attached to each individual material object.

7. The database integration management system according to claim 6, wherein said electronic circuit chip receives a radio wave sent from an external source, and sends the material-object identification code to an external source.

8. The database integration management system according to claim 1, wherein the plurality of material-object information stored in said material-object information database include at least one of producer information obtained during the production of the material object, forwarding agent information obtained during the transportation of the material object, and consumer information obtained during the purchase of the material object.

9. The database integration management system according to claim 1, wherein said integrated material-object information storing module sends a request for material-object information identified by the material-object identification code to the material-object information modules in said each business category in response to an evaluation information about a material object input, and receives, in response to said request, a plurality of material-object information corresponding to the material-object identification code.

10. The database integration management system according to claim 1, further comprising:
a receiving module for receiving a request for sending the material-object identification code and the integrated material-object information identified by the material-object identification code,
wherein said integrated material-object information storing module sends a request for material-object information identified by the material-object identification code received at said receiving module to the material-object information module and receives, in response to said request, a plurality of material-object information corresponding to the material-object identification code.

* * * * *